US011699263B2

(12) United States Patent
Ziegler et al.

(10) Patent No.: US 11,699,263 B2
(45) Date of Patent: Jul. 11, 2023

(54) APPARATUS, METHOD AND COMPUTER PROGRAM FOR RENDERING A VISUAL SCENE

(71) Applicant: Fraunhofer-Gesellschaft zur Förderung der angewandten Forschung e.V., Munich (DE)

(72) Inventors: Matthias Ziegler, Erlangen (DE); Joachim Keinert, Erlangen (DE); Benjamin Cappell, Erlangen (DE); Thorsten Wolf, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 41 days.

(21) Appl. No.: 17/018,982

(22) Filed: Sep. 11, 2020

(65) Prior Publication Data
US 2021/0082185 A1    Mar. 18, 2021

(30) Foreign Application Priority Data
Sep. 13, 2019    (EP) ...................................... 19197276

(51) Int. Cl.
*G06T 17/20*    (2006.01)
*G06T 7/50*    (2017.01)
(Continued)

(52) U.S. Cl.
CPC ................ *G06T 17/20* (2013.01); *G06T 7/50* (2017.01); *G06T 15/04* (2013.01); *G06T 15/10* (2013.01); *G06T 15/50* (2013.01)

(58) Field of Classification Search
CPC ........... G06T 17/20; G06T 7/50; G06T 15/04; G06T 15/10; G06T 15/50
See application file for complete search history.

(56) References Cited

U.S. PATENT DOCUMENTS 5,687,307 A * 11/1997 Akisada .................. G06F 3/011
345/428
2004/0085325 A1 * 5/2004 Wang ..................... G06T 11/001
345/582

(Continued)

OTHER PUBLICATIONS

Debevec, Paul E., Camillo J. Taylor, and Jitendra Malik. "Modeling and rendering architecture from photographs: A hybrid geometry- and image-based approach." In Proceedings of the 23rd annual conference on Computer graphics and interactive techniques, pp. 11-20. 1996. (Year: 1996).*

(Continued)

*Primary Examiner* — King Y Poon
*Assistant Examiner* — Vincent Peren
(74) *Attorney, Agent, or Firm* — Perkins Coie LLP; Michael A. Glenn

(57) ABSTRACT

An apparatus for rendering a visual scene includes: a content visualization stage configured: to obtain as a first input a set of images of one or more objects, and to obtain as a second input a geometry representation of the one or more objects in a 3D-space; to obtain a final image representing the visual scene from a perspective of a target position, the visual scene including the one or more objects; to consider at least one of a lighting effect and/or an object interaction effect between the one or more objects and one or more further objects contained in the visual scene; the content visualization stage is configured to obtain a target view image from the set of images irrespective of the geometry representation. The apparatus is configured to map the target view image on the geometry representation under consideration of the target position.

19 Claims, 21 Drawing Sheets

(51) Int. Cl.
   *G06T 15/04*  (2011.01)
   *G06T 15/10*  (2011.01)
   *G06T 15/50*  (2011.01)

(56) References Cited

U.S. PATENT DOCUMENTS

2018/0293774 A1   10/2018  Yu
2020/0279384 A1*  9/2020   Jia ........................... G06T 7/529
2022/0139023 A1*  5/2022   Varekamp ............... G06T 15/40
                                                        345/582

OTHER PUBLICATIONS

LearnOpenGL—Collision detection, URL: https://learnopengl.com/In-Practice/2D-Game/Collisions/Collision-detection; retrieved Sep. 11, 2020.
UE4—AnswerHub, Make an object invisible but with shadows, URL: https://answers.unrealengine.com/questions/31993/make-an-object-invisible-but-with-shadows.html; retrieved Sep. 11, 2020.
E. H. Adelson, and J. R. Bergen, "The plenoptic function and the elements of early vision", Vision and Modeling Group, Media Laboratory, Massachusetts Institute of Technology., 1991.
Debevec et al., "Modeling and Rendering Architecture From Photographs: A Hybrid Geometry-And Image-Based Approach", Computer Graphics Proceedings 1996 (SIGGRAPH), 1996.
M. Levoy, and P. Hanrahan, "Light field rendering." pp. 31-42, Proc. ACM SIGGRAPH, 1996.
S. J. Gortler, R. Grzeszczuk, R. Szeliski, and M. F. Cohen, "The lumigraph." pp. 43-52., 1996.
J. Cohen, M. Olano, and D. Manocha, "Appearance-preserving simplification." pp. 115-122., 1998.
P. Cignoni, C. Montani, C. Rocchini, and R. Scopigno, "A general method for preserving attribute values on simplified meshes." Proceedings Visualization (Cat. No. 98CB36276), Research Triangle Park, NC, USA, pp. 59-66, doi: 10.1109/VISUAL.1998.745285., 1998.
P. Debevec, Y. Yu, and G. Borshukov, "Efficient view-dependent image-based rendering with projective texture-mapping," Rendering Techniques' 98, pp. 105-116: Springer., 1998.
D. N. Wood, D. I. Azuma, K. Aldinger, B. Curless, T. Duchamp, D. H. Salesin, and W. Stuetzle, "Surface light fields for 3D photography" pp. 287-296., 2000.
H. P. Lensch, W. Heidrich, and H.-P. Seidel, "Automated texture registration and stitching for real world models." pp. 317-452., 2000.
Buehler, Chris, Michael Bosse, Leonard McMillan, Steven J. Gortler,and Michael Cohen, "Unstructured lumigraph rendering", InProceedings of the 28th annual conference on computer graphicsand interactive techniques (SIGGRAPH 2001), 2001.
T. Kaneko, T. Takahei, M. Inami, N. Kawakami, Y. Yanagida, T. Maeda, and S. Tachi, "Detailed shape representation with parallax mapping." pp. 205-208, 2001, 2001.
Brawley; ShaderX3: Advanced Rendering with DirectX and OpenGL, 2.5 "Parallax Occlusion Mapping: Self-Shadowing, Perspective-Correct Bump Mapping Using Reverse Height Map Tracing", Charles River Media, 2005., 2005.
M. Kazhdan, M. Bolitho, and H. Hoppe, "Poisson surface reconstruction", Eurographics Symposium on Geometry Processing., 2006.
E. Haines, T. Akenine-Möller and N. Hoffman, "Real-time rendering", Chapter 2 "The Graphics Rendering Pipeline", AK Peters/CRC Press., 2008.
M. Eisemann, B. De Decker, M. Magnor, P. Bekaert, E. De Aguiar, N. Ahmed, C. Theobalt, and A. Sellent, "Floating textures." pp. 409-418, EUROGRAPHICS 2008, vol. 27, No. 2, 2008.
A. Dessein, W. A. Smith, R. C. Wilson, and E. R. Hancock, "Seamless texture stitching on a 3D mesh by Poisson blending in patches.", 2014 IEEE International Conference on Image Processing (ICIP), Oct. 27-30, 2014, pp. 2031-2035., 2014.
W.-C. Chen, J.-Y. Bouguet, M. H. Chu, and R. Grzeszczuk, "Light field mapping: Efficient representation and hardware rendering of surface light fields." pp. 447-456., 2014.
A. Collet, M. Chuang, P. Sweeney, D. Gillett, D. Evseev, D. Calabrese, H. Hoppe, A. Kirk, and S. Sullivan, "High-quality streamable free-viewpoint video," ACM Transactions on Graphics (TOG), vol. 34, No. 4, pp. 69., 2015.
P. Hedman, T. Ritschel, G. Drettakis, and G. Brostow, "Scalable inside-out image-based rendering," ACM Transactions an Graphics, ACM, vol. 35, No. 6, Nov. 11, 2016, (Nov. 11, 2016), pp. 1-11, XP058306382, 2016.
M. Ziegler, J. Keinert, N. Holzer, T. Wolf, T. Jaschke, R. op het Veld, F. S. Zakeri, and S. Foessel, "Immersive virtual reality for live-action video using camera arrays," in IBC Conference, Amsterdam, Netherlands, 2017, pp. 1-8., 2017.
Sai BI et al: "Patch-based optimization for image-based texture mapping", ACM Transactions on Graphics, ACM, 2 Penn Plaza, Suite 701 New York NY 10121-0701 USA, vol. 36, No. 4, Jul. 20, 2017 (Jul. 20, 2017), pp. 1-11, XP058372880, 2017.
J. Flynn, M. Broxton, P. Debevec, M. DuVall, G. Fyffe, R. Overbeck, N. Snavely, and R. Tucker, "DeepView: View Synthesis with Learned Gradient Descent," arXiv preprint arXiv:1906.07316., 2019.
J. Thies, M. Zollhöfer, and M. Nießner, "Deferred Neural Rendering: Image Synthesis using Neural Textures," arXiv preprint arXiv:1904.12356., 2019.
J. F. Blinn, "Simulation of wrinkled surfaces." pp. 286-292, ACM SIGGRAPH Computer Graphics, Aug. 1978.
D. Porquet, J.-M. Dischler, and D. Ghazanfarpour, "Real-time high-quality view-dependent texture mapping using per-pixel visibility." pp. 213-220., not available.
R. S. Overbeck, D. Erickson, D. Evangelakos, M. Pharr, and P. Debevec, "A system for acquiring, processing, and rendering panoramic light field stills for virtual reality." p. 197, CM Trans. Graph., vol. 37, No. 6, Article 197., Nov. 2018.
Chen, Chih-Fan , et al., "Dynamic omnidirectional Texture Synthesis for Photorealistic Virtual Content Creation", IEEE International Symposium on Mixed and Augmented Reality Adjunct (ISMAR-Adjunct), IEEE, Oct. 16, 2018 (Oct. 16, 2018), pp. 85-90, XP033542879, 2018.

* cited by examiner

APPARATUS, METHOD AND COMPUTER PROGRAM FOR RENDERING A VISUAL SCENE

CROSS-REFERENCE TO RELATED APPLICATION

This application claims priority from European Patent Application No. EP 19197276.9, which was filed on Sep. 13, 2019 and is incorporated herein in its entirety by reference.

The present disclosure is concerned with realistic computer graphics. In particular, the disclosure proposes a way to realistically integrate a rendered image into a computer generated scene. Embodiments of the present disclosure relate to an apparatus, a method and a computer program for rendering a visual scene. Some particular and non-limiting embodiments of the present disclosure relate to a combination of light-field rendering and mesh-based rendering in real-time 3D environments for photo-realistic textures. Some further particular and non-limiting embodiments of the present disclosure relate to light-field rendering using texture mapping onto a proxy geometry.

BACKGROUND OF THE INVENTION

Researchers and engineers in different domains aim to maximize the realism of computer-generated images (CGI). The problem is complex as the experienced realism of any rendering depends on many different factors. Besides high resolution, light and shadow, transparencies and reflections are extremely important. Otherwise, human beings experience an image as unnatural. Complex concepts have been developed and implemented in modern graphics hardware and software such that modern GPUs can render a computer-generated (CG) scene with high resolution and high framerates, including proper lighting, proper shadows and partially also reflections.

Nevertheless, photorealistic real-time rendering is still difficult. The reason is that only raytracing techniques can deliver highly realistic results, because physical effects are thoroughly simulated. However, raytracing is computationally very demanding, and despite the existence of hardware accelerators, full-scene raytracing in real-time is still not possible. Consequently, for real-time rendering, typically projection based approaches are used, where geometry primitives are mapped onto a 2D image. Illumination effects can then be applied in 3D space for every geometry primitive (forward shading), or in the pixel space (deferred shading) to save even more computation power. However, then the realism is even further reduced.

A CG scene typically comprises a set of 3D objects often stored as meshes and equipped with textures that hold information on color and materials. The meshes may originate from 3D modeling software or 3D reconstruction techniques. 3D reconstruction techniques such as Structure-from-Motion (SfM) aim to reconstruct the shape of an object based on a series of photographs. These methods typically focus on the geometry of an object. Preserving the true look of an object is of minor importance.

In contrast, light-fields can reproduce natural content with high photorealism, including view-dependent appearance. Moreover, rendering preserves the resolution of the captured footage. And more importantly, using dense light-fields allows capturing scenes that are very difficult to process with photogrammetry. Light-field reconstruction and rendering techniques aim to preserve and replay the true appearance of an object, including view-dependent effects such as specularities or reflections. The geometry of the considered object is of minor importance but light-field related rendering techniques such as depth-image-based rendering (DIBR) also rely on implicit geometry data. As light-fields tend to provide higher image quality for real-world objects inside CG rendering environments, their usage in standard CG rendering pipelines is appealing but also comes with a central problem: without explicit geometry information, rendering engines cannot simulate the effect of new lights that are only present in the CG environment.

Photorealistic appearance involves the precise simulation how light interacts with a given object. This can be achieved by manually modeling objects as 3D meshes. For a photorealistic impression, the mesh needs to be equipped with texture information and material properties. In combination with raytracing techniques for rendering, photorealistic images can be obtained. While this is a frequently performed approach, generating a precise and photorealistic model is challenging and time consuming. In addition, raytracing is currently still too slow for real-time applications.

In order to achieve sufficient rendering speed, the geometry modeled in a first step typically approximates the real object's geometry. In a second step, one or several photos or images can be mapped onto this coarse model. This however usually causes stitching borders when computing for instance the albeido texture of the mesh. While algorithms are available to handle such situations [9-11], fine-grained details can get lost.

Even worse, such an image projection textures the mesh only with the Lambertian or view-independent part plus a static slice of the view-dependent part [12]. Photorealism, however, involves also reconstructing or simulating the view-dependent parts according to the spectator's position. To this end, it would be useful to reconstruct the material properties, and then perform a complex rendering using raytracing or other approximations.

This problem can be alleviated by using view dependent texturing. In this case, several input photographs (or UV-maps) are combined during run-time to compute a view-dependent texture for an object, using for instance alpha-blending of the three textures captured by the three cameras closest to the target view [13]. Such an approach however leads to stitching artefacts when the 3D geometry is not precise enough.

Reference [14] in some sense also uses view rendering. It defines a number of reference camera views that are used to compute the view-dependent texture of the object. Each of the reference camera views has an associated depth map. Rendering is then performed by computing for each pixel to render its associated position in space using the 3D mesh geometry (Point P in FIG. 17). Next the pixels in the reference cameras that potentially observe this point in 3D space are determined. Based on the per-view depth map, the real points in the 3D space are calculated (Points P1 and P2 in FIG. 17). The camera which observes the point closest to point P is then used for rendering the color of point P. However, as made obvious in FIG. 17, this cannot solve the problem of stitching errors, because in essence the simplified geometry is used to re-project the reference views to the target camera position. Moreover, neighbored target pixels might be rendered from different reference cameras, which is prone to errors such as color mismatches. Finally, the approach fails if the depth maps of the reference views are imprecise or even have errors. This is particularly problematic when targeting the use of densely sampled light-fields [15] for texturing an object. In such cases, very good view rendering quality can be achieved although the depth map may be erroneous. However, a depth-based selection of reference cameras does not work.

Instead of view-dependent texturing, view-dependent effects can also be reproduced by means of image based rendering that is steered by a global or by a per-view geometry. References [16] and [15] propose to generate for every reference view a depth map using a global geometry model as guide. This depth map is then converted in a per-view mesh, which is used to render the reference views to the target camera view. All rendered views are then blended based on angular and spatial similarity of the target and the reference camera. Since a coarse per-view mesh is used for rendering, the method is sensitive to blurring [16]. Moreover, the final target view is only generated in the image space. This causes that proper interaction with additional light sources or mechanical interaction with other objects is difficult: The global geometry is not aligned with the reference views, and relying on the per-view meshes increases computation due to their large number and may also result in contradicting results, because corresponding points in two images may be projected to different points in 3D space.

While all these methods use captured images to render the final image, surface light-fields [17] assign view dependent textures to the mesh polygons. In other words, texture value $f(r, s, \phi, \theta)$ for a pixel $(r, s)$ on the mesh polygon depends on the view direction $(\phi, \theta)$. Most of the literature [18][17] discusses methods how to efficiently store these view dependent textures in regular data structures. All these representations assume that for a given $(r, s)$ the set of values $\{f(r, s, \phi, \theta)|\forall\phi, \forall\theta\}$ represents the same point in 3D space, otherwise the compression efficiency is lowered, and rendering artefacts may appear. However, if $f(r,s,\phi,\theta)$ shall be computed from captured images and if the mesh only approximates the real object geometry, this is difficult to achieve and involves a depth dependent image resampling leading to information losses.

Such a problem can be avoided by deferred neural rendering [19]. Instead of a 3-dimensional UV map, the method uses a multi-dimensional feature map, whose first three dimensions correspond to the albeido of the mesh. This multidimensional feature map is then projected into the screen-space for a given target view. Next, a neuronal network is used to convert this projected feature map into RGB texture map. By these means, even defects in the underlying geometry can be compensated. However, if the geometry gets too coarse, the rendering gets very blurry. Moreover, the multi-dimensional feature map is difficult to interpret, and hence to compress, and the texture maps need to be resampled as well.

The achievable rendering performance heavily depends on the number of mesh polygons that may be used to describe an object. Unfortunately, a simple mesh typically does not look very photorealistic. Consequently, there are several approaches in literature how to increase photorealism despite a low number of mesh polygons, i.e. a simplified geometry. Bump mapping [20] or normal mapping [21, 22] for instance allow more realistic illumination effects by assuming for every pixel of a mesh polygon a normal that may differ from the normal of the mesh polygon itself. Parallax mapping [23] shifts texture pixels based on a height-map and a viewing angle to give a better (but still not perfect) simulation of more complex surface geometries. It does not take occlusions into account and fails in case of large height jumps, because parallax mapping assumes that heights of neighbor points are similar. Parallax occlusion mapping [24] approximately intersects a ray with the height-field to compute the correct color for a pixel in the target camera that is projected on the mesh polygon along the ray. By these means, self-occlusions can be taken into account. The quality of the rendering is high, fails however when the observing direction is along the silhouette of an object, because in this case the viewing ray does not intersect with the mesh polygons anymore. Moreover, finding the precise intersection point between the height-field and the observed ray is not simple to compute. In addition, view dependent effects need to be computed by raytracing or corresponding approximations and cannot be baked in. And finally, the method only works when a precise height-map can be computed, which excludes again the benefits from densely sampled light-fields.

Google Seurat [26] is another technology to achieve high photorealism in combination with a reduced polygon number. It defines a cube from which the scene is primarily seen. Then, starting from a high-polygon mesh, a novel mesh is created using some photogrammetry based technology that strongly reduces the number of polygons compared to the original mesh. It essentially exploits the fact that the mesh will only be observed from a limited number of view-points, such that coarse mesh approximations can be elegantly hidden. In addition, a static texture is computed. By these means, view dependent effects cannot be baked in. On the other hand, given the low number of polygons, view dependent effects can be more easily recomputed during run-time. The method however fails when the observer moves outside of the previously defined viewing region. In this case, heavy artefacts appear. Or in other words, in case an object is observed from all directions, there are not many simplification possibilities.

The publication by Ziegler et al. [25] from 2017 shows, how light-fields can be combined with classical CG pipelines, i.e. how image based rendering can be combined with mesh-based virtual reality. The proposed method projects the light-field onto a planar surface somewhere between the true object and the observer. In order to integrate DIBR into a 3D engine, a planar screen can be used as shown in FIG. 18A. Here, DIBR computes the intersection point of a line with the screen. The line connects the virtual world point M (based on the camera parameters and the disparity maps) and the camera center of the observer camera $P_v$. Repeating this process for all input points yields an image of the actor on the screen. The dashed lines in FIG. 18A illustrate that the person is not an explicit object. Instead, the screen creates the illusion of an object placed at the depicted position. For comparison, FIG. 18B illustrates the same situation but with a mesh instead of a light-field representation (LFR). In principle, both rendering strategies can end up with a very comparable visual result. If the light-field is stored in a 4D representation (with UV-ST coordinates) a similar strategy, shown in FIG. 19, can be applied: The intersection points of a camera ray with the two parallel planes (UV and ST) specify a specific ray coming from the LFR. Again, the resulting pixel may be mapped onto the corresponding intersection point on the screen.

The 2D plane associated with the screen, as for example shown in FIGS. 18A and 19, does obviously not resemble the geometry of most real world objects. Consequentially, any shadow or lighting effect computed from this planar surface is incorrect in terms of shape and position. Moreover, non-planar camera setups are not directly supported.

Solving the problem of wrong shadows for planar screens can be solved by using invisible objects casting shadows [27]. This means that the light-field screen is constructed in such a way that it does not create any shadow. On the other hand, for each object visible in the light-field, a proxy object or mesh is created that is invisible. Its only purpose is to create an approximate shadow. Thus, shadow computation is decoupled from the object form. However, this does not solve the problem with wrong direct and indirect illumination. Moreover, occlusions between different objects, in particular objects visible in the light-field and objects created by computer graphics, are still not correct. And also the mechanical/physical interactions between objects cannot be modelled properly. Finally, in case the proxy or the proxy mesh is only a coarse approximation, the shadow is still not perfect.

In a similar way as shadows can be created from additionally introduced objects, mechanical interactions can be controlled by placing simple objects like cuboids or circles into the scene [28]. Such simple geometries have the benefit of simple mathematic equations to detect collisions and are hence advantageous compared to using the full mesh for collision detection.

Thus, it is an object of the present invention to integrate photorealistic footage into CG environments or scenes while avoiding the shortcomings and disadvantages described above.

SUMMARY

According to an embodiment, an apparatus for rendering a visual scene may have: a content visualization stage configured to obtain as a first input a set of images of one or more objects, and to obtain as a second input a geometry representation of the one or more objects in a 3D-space, the geometry representation including a position information of the one or more objects within the visual scene, obtain a final image representing the visual scene from a perspective of a target position, the visual scene including the one or more objects, and consider at least one of a lighting effect and/or an object interaction effect between the one or more objects and one or more further objects contained in the visual scene, wherein the content visualization stage includes: a target view synthesis stage configured to obtain a target view image from the set of images irrespective of the geometry representation, the target view image representing the one or more objects from the perspective of the target position, and a texture mapping block being configured to map the target view image on the geometry representation under consideration of the target position.

According to another embodiment, a method for rendering a visual scene may have the steps of: obtaining as a first input a set of images of one or more objects, and obtaining as a second input a geometry representation of the one or more objects in a 3D-space, the geometry representation including a position information of the one or more objects within the visual scene, obtaining a final image representing the visual scene from a perspective of a target position, the visual scene including the one or more objects, and considering at least one of a lighting effect and/or an object interaction effect between the one or more objects and one or more further objects contained in the visual scene, wherein the method may further have the steps of: synthesizing a target view image from the set of images irrespective of the geometry representation, the target view image representing the one or more objects from the perspective of the target position, and mapping the target view image on the geometry representation under consideration of the target position.

According to yet another embodiment, a non-transitory digital storage medium having a computer program stored thereon to perform the inventive method, when said computer program is run by a computer.

Therefore, the present disclosure proposes an apparatus for rendering a visual scene according to claim 1. The apparatus comprises a content visualization stage configured to obtain as a first input a set of images of one or more objects, and to obtain as a second input a geometry representation of the one or more objects in a 3D-space, the geometry representation comprising a position information of the one or more objects within the visual scene. The content visualization stage is further configured to obtain a final image representing the visual scene from a perspective of a target position, the visual scene comprising the one or more objects. The content visualization stage is further configured to consider at least one of a lighting effect and/or an object interaction effect between the one or more objects and one or more further objects contained in the visual scene. The content visualization stage comprises a target view synthesis stage configured to obtain a target view image from the set of images irrespective of the geometry representation, the target view image representing the one or more objects from the perspective of the target position. The content visualization stage further comprises a texture mapping block being configured to map the target view image on the geometry representation under consideration of the target position. The central idea of the disclosed apparatus is, that the content visualization stage may comprise two blocks, namely the target view synthesis stage and the texture mapping block. By obtaining the target view image irrespective of the geometry representation, the quality of the target view image, in particular a texture information of the target view image, may be independent of the geometry representation, i.e. the quality of the target view image may primarily depend on the quality of the set of images. In other words, the synthesis of the target view image from the set of images may be meshless. A synthesis of the target view image irrespective of the geometry representation may prevent artifacts, such as stitching errors, in the target view image, which may arise from a synthesis based on a geometry representation with an insufficient precision. Thus, even if the geometry representation, such as a mesh or a geometry, is very coarse, the quality of the target view image may be very good. By mapping the target view image on the geometry representation, the high quality texture of the target view image may be combined with the position information of the one or more objects comprised in the geometry representation. Using the geometry representation may be beneficial for considering lighting effects. For example, the geometry representation may be used to compute lighting effects, such as computer generated illumination, shading, reflections or specularities, for example by raytracing, such that the lighting effects may be considered very accurately, leading to a very realistic final image. Similarly, the geometry representation may be beneficial for considering object interaction effects, such as occlusions. The mapping of the target view image on the geometry representation enables a combination of the benefits of the target view image, such as a high resolution texture, with the benefits of the geometry representation for considering lighting effects and object interaction effects. Often, a densely sampled light field of an object comprises a high resolution texture information of the object but a vague spatial or depth information of the object, such that an implementation of object interaction effects and/or lighting effects based solely on the light-field may be erroneous. As the content visualization stage uses the geometry representation primarily for considering lighting effects and object interaction effects, a coarse mesh may be sufficient to obtain a realistic image of a CG scene. Thus, first synthesizing the target view image in the target view synthesis stage and subsequently considering interaction effects by using the geometry representation in the texture mapping block may combine the advantages of light-field rendering and geometry based rendering while avoiding artifacts arising from an imprecise geometry representation. Using a coarse mesh as a geometry representation may lower the computational effort and increase the rendering speed. Thus, the possibility of using a coarse mesh and still obtaining a high quality texture of the one or more objects provides a way to render CG scenes with high resolution light field objects and realistic lighting and object interaction effects at high frame rates. In other words, the proposed apparatus may provide means for integrating high resolution, photo-realistic content, e.g. light-field content into a CG scene, allowing for proper occlusions between objects, as well as better relighting. This disclosure may combine classical 3D rendering with, e.g. light-field rendering, thus combining the benefits of image based rendering with capabilities of traditional meshes such as occlusion tests. The apparatus described herein may directly compute the lighting and object interaction effects based on the geometry representation and the color information based on the set of images, e.g. a light-field representation.

A further aspect concerns a method for rendering a visual scene, the method comprising the steps: obtaining as a first input a set of images of one or more objects, and obtaining as a second input a geometry representation of the one or more objects in a 3D-space, the geometry representation comprising a position information of the one or more objects within the visual scene; obtaining a final image representing the visual scene from a perspective of a target position, the visual scene comprising the one or more objects; considering at least one of a lighting effect and/or an object interaction effect between the one or more objects and one or more further objects contained in the visual scene; obtaining a target view image from the set of images irrespective of the geometry representation, the target view image representing the one or more objects from the perspective of the target position; mapping the target view image on the geometry representation under consideration of the target position. The method relies on the same idea and principles as the apparatus described above.

According to a further aspect, computer programs are provided, wherein each of the computer programs is configured to implement the above-described method when being executed on a computer or signal processor, so that the above-described method is implemented by one of the computer programs.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
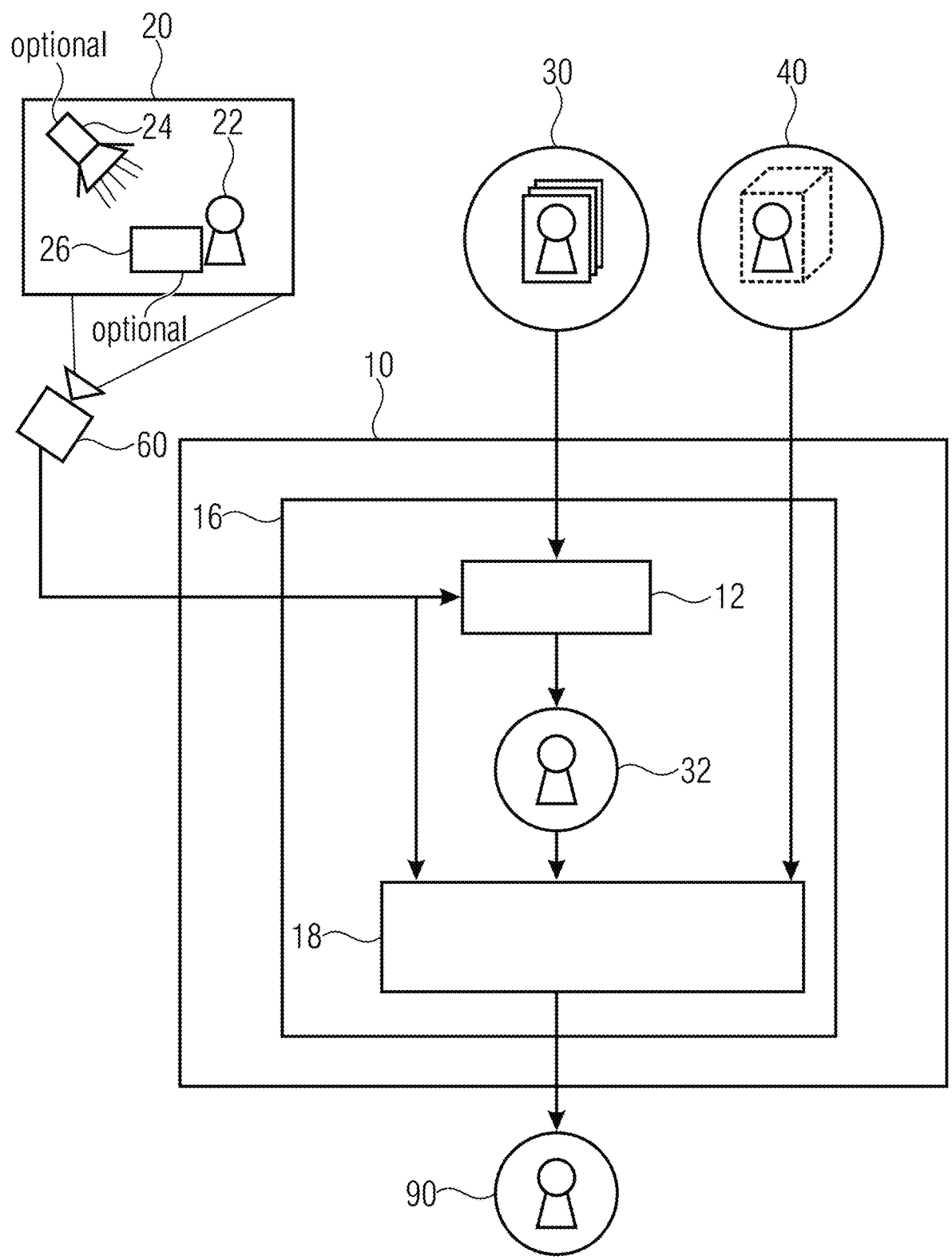
FIG. 1 shows a schematic representation of an apparatus for rendering a visual scene according to an embodiment.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

1. Terminology and Basic Explanations

Before describing the invention in detail by means of the figures, some basic explanations and clarification of terminology is given, which apply to the entire description of the invention.

In the area of computer graphics, a mesh describes the surface of an object. Typically, a mesh is composed from many connected triangular surface entities (triangles). Many connected vertices form a 3D polygon. For each polygon, a texture map holds additional data that defines the look or other properties of the surface (e.g. the color of the surface). Often, texture maps are stored as UV-maps, because the texture pixels are addressed by two coordinates (u, v). UV-maps are typically stored as bitmap images.

A view-independent texture holds information on the surface that does not depend on the observer's position. Albeido textures are view-independent textures that are also independent of the incident illumination.

Material functions define how a surface should be rendered. This is achieved by including references to the textures it uses, color tints and more. By these means, material functions define the final appearance of a CG object. Based on the information provided by the UV-maps (albeido textures) or other input images, various visual effects can be implemented inside a material function, such as reflections.

A light-field comprises all light rays that pass through a specific volume or a plane [1-3]. Re-sampling this plenoptic function yields a new view of the captured scene. The underlying light-field can be stored in different representations: In example as a 5D plenoptic function [1], as a 4D plenoptic function [2], as a set of images, or as a set of images and corresponding disparity maps [1]. The term light-field representation (LFR) bundles all these different representation schemes. Such LFR's can be obtained by different means such as dense sampling, light-field reconstruction from sparse sampling or by simulation (e.g. rendering a CG scene from a plurality of camera positions). Though this disclosure often refers to rendering based on images plus depth or disparity maps (depth image based rendering (DIBR)), the text is not limited to this specific rendering method. A novel view may be obtained from a LFR and a suitable novel view synthesis (NVS) method. The LFR may also be encoded by any appropriate encoding scheme, e.g. for compression purpose.

Image based depth-reconstruction (stereo-matching or multi-view stereo matching (MVS)) represents one common method for light-field reconstruction. Given a plurality of images of the same scene captured with a multi-camera array (MCA) or a single camera, stereo-matching aims to reconstruct dense disparity maps for all or a subset of input images. MCA are in example advantageously used for dynamic scenes whereas a moving single camera may be used for a static scene. The images and the estimated disparity maps (also referred to as depth maps) form a LFR. Those disparity maps may also serve as base for a subsequent surface reconstruction step. The reconstructed surface may then be represented as a mesh and may be simplified to obtain a possibly coarse geometric model of the object or scene.

Image based rendering [2][1][4] is a technique to synthesize a novel view from a set of images in case no geometry information is available. To this end, a novel target view is represented by a virtual target camera. Then for each pixel of the image to synthesize, a ray is casted through the nodal point of the lens. The ray determines the closest available input cameras as well as the intersected pixels in the corresponding input pixels. These are then interpolated to form the pixel of the virtual target camera.

For general scenes, image based rendering can only deliver high rendering quality in case the cameras densely sample the light-field. For a sparse sampling where neighboring cameras have a non-negligible distance, DIBR can be applied. The input to DIBR is a set of RGB images, each with an associated depth map. The depth map essentially describes for each pixel a location in 3D space. This information allows synthesizing a new view for a virtual camera. By merging several novel views synthesized from different input views, occlusions can be mitigated. Technically, DIBR is often performed by a forward warp of the depth map to the virtual camera. Then a backward warp computes for every target pixel its color [5]. This two-staged approach allows subpixel interpolation of the RGB values and thus avoids image artefacts. Please note that the result of depth image based rendering is a target RGB image plus a target depth map. In other words, for every rendered RGB pixel, also the associated depth value is known.

Traditionally, DIBR uses one depth map per RGB image. Alternatively, so called multiplane images can be used [6]. In this representation, typically one reference camera and a set of associated depth planes are defined. Typically, the depth planes are orthogonal to the optical axes of the reference camera. Then all pixels of all cameras of the multi-camera system are mapped onto these depth planes. Conceptually, this can be achieved by rendering all cameras to the reference camera position using depth image based rendering. Then every resulting pixel is drawn on the depth plane that is closest to the depth value of the pixel. As a result, the information of all cameras is condensed in one data structure for which view-rendering is very easy based on the homographies as induced by the depth planes. Moreover, one pixel can have several depth and color values, which is advantageous for semitransparent objects, because one pixel can cover several 3D points. It has to be noted that instead of using DIBR, multiplane images can also be created directly from the source images [6]. Since in the following it does not make any difference whether DIBR or multiplane images are used, we use the terms in an exchangeable way.

Unreal Engine or Unity form well-known representatives for real-time rendering engines. They are commonly used for video games and offer a large variety of different features, including direct support for many Head-Mounted Displays (HMD). Those engines implement classical 3D rendering pipelines very efficiently and exploit the capabilities of modern graphics hardware in order to maximize the rendering performance. They are optimized for real-time rendering and thus only give an approximation of reality. On a coarse level, a classical rendering pipeline comprises four stages [7]: Application, Geometry Processing, Rasterization and Pixel processing. The geometry stage can be further divided into substages, namely: Vertex shading, Projection, Clipping and Screen Mapping. The vertex shading stage is especially important for realistic lighting and shadow effects, i.e. those stages determine if a vertex can directly see a light source and how the material responds to light. Within the Pixel processing stage, the pixel shading block determines the final color value for a pixel based on the material properties.

Given a point cloud of a scene, surface reconstruction techniques such as Poisson surface reconstruction (PSR) [8] reconstruct the surface of the objects within the scene. As a result, one may obtain a mesh and associated color information.

In the following, the correlation between light-field rendering, DIBR, 3D projection and 3D reconstruction is demonstrated. In the area of CG, the projection matrix P expresses the central relation between a 3D world point M and a projected point m on the image plane based on a pinhole camera model. P is composed from a 3×3 camera matrix K (intrinsic camera parameters), and a 3×3 rotation matrix R plus a camera's position C forming the extrinsic camera parameters according to the following equation:

$$P = K \cdot R \cdot [I - C]$$

$$m = [uv1]^T = P \cdot M = P \cdot [XYZ1]^T$$

Figure 16:
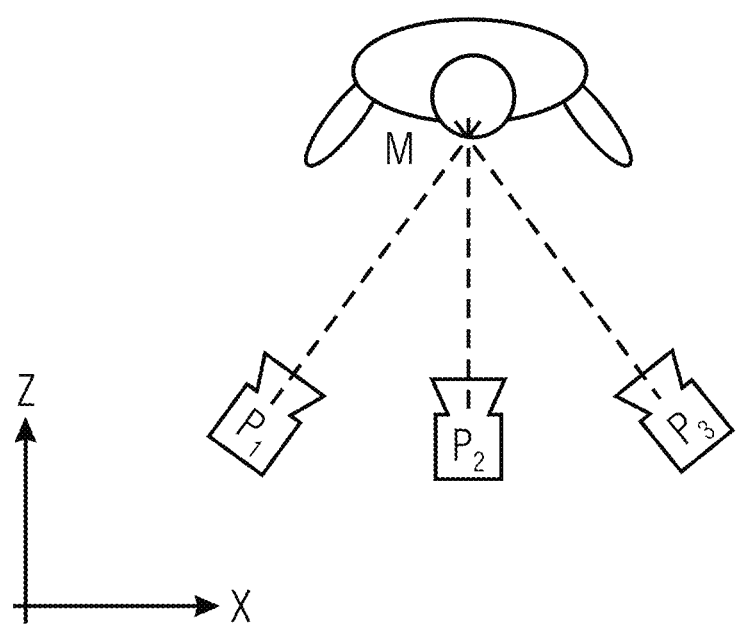

Both m and M are expressed in homogeneous coordinates. In classical 3D projection environments such as gaming engines, the 3D points M may originate from a mesh and its associated vertices. FIG. 16 shows a simple scene setup. Three cameras observe an actor and all cameras see the highlighted point M. Structure from Motion (SfM) pipelines aim to inverse the projection process. Given a set of two or more correlated image points (here $m_1$ and $m_2$) and corresponding projection matrices $P_1$ and $P_2$, the location of a 3D point M may be reconstructed.

$$\begin{bmatrix} m_1 \\ m_2 \\ \dots \\ m_N \end{bmatrix} = \begin{bmatrix} [u_1 \ v_1 \ 1]^T \\ [u_2 \ v_2 \ 1]^T \\ \dots \\ [u_N \ v_N \ 1]^T \end{bmatrix} = \begin{bmatrix} P_1 \\ P_2 \\ \dots \\ P_N \end{bmatrix} \cdot M = \begin{bmatrix} P_1 \\ P_2 \\ \dots \\ P_N \end{bmatrix} \cdot [X \ Y \ Z \ k]^T$$

$$M = \begin{bmatrix} P_1 \\ P_2 \\ \dots \\ P_N \end{bmatrix}^{-1} \cdot \begin{bmatrix} m_1 \\ m_2 \\ \dots \\ m_N \end{bmatrix}$$

Here, two image points are denoted correlated if they observe the same 3D point as shown. The process may be repeated for all correlated image points yielding a set of 3D points (e.g. represented as a point cloud (PC)). This point cloud may be further converted into a mesh. This mesh then represents the underlying object explicitly and the original camera parameters and their associated images are not needed anymore. A 3D object may also be expressed implicitly as depth-map or as a disparity map. In essence, a disparity map encodes the correlation between a pair of stereo images. For each pixel of an image, a disparity map associates a disparity value d. As shown below, d expresses the shift of a corresponding pixel in the images of the stereo cameras.

$$\begin{bmatrix} [u_1 \ v_1 \ 1]^T \\ [u_1+d \ v_2 \ 1]^T \end{bmatrix} = \begin{bmatrix} P_1 \\ P_1' \end{bmatrix} \cdot M = P_{comp} \cdot M \quad (4\text{-}1)$$

Here, $P_1'$ denotes a camera with the same intrinsic and extrinsic parameters $P_1$, but shifted along the cameras X-axis by some distance b. Often, this camera $P_1'$ is not existing and serves only for normalization and interpretation purposes.

$P_1' = K_1 \cdot R_1 \cdot [I - (C_1 + R_1 \cdot [b00]^T)]$

Eq. 4-1 above can be solved for M yielding:

$$M = P_{comp}^{-1} \cdot \begin{bmatrix} [u_1 \ v_1 \ 1]^T \\ [u_1+d \ v_2 \ 1]^T \end{bmatrix}$$

Formally, this result shows how a disparity map and the associated camera parameters implicitly encode a 3D world point. DIBR exploits this: Instead of an explicit 3D model, DIBR computes the new location of a pixel $<u_1, v_1>$, its associated disparity and color information $<d, r, g, b>$ purely based on this implicit geometric information.

$$m_{DIBR} = P_v \cdot P_{comp}^{-1} \cdot \begin{bmatrix} [u_1 \ v_1 \ 1]^T \\ [u_1+d \ v_2 \ 1]^T \end{bmatrix}$$

Here, $P_v$ denotes the projection matrix of the virtual target camera.

2. Apparatus for Rendering Visual Content According to FIG. 1

FIG. 1 shows a schematic representation of an apparatus 10 for rendering a visual scene 20 according to an embodiment. The apparatus 10 may comprise a content visualization stage 16 configured to obtain as a first input a set of images 30 of one or more objects 22, and to obtain as a second input a geometry representation 40 of the one or more objects 22 in a 3D-space, the geometry representation 40 comprising a position information of the one or more objects 22 within the visual scene 20.

The content visualization stage 16 may further be configured to obtain a final image 90 representing the visual scene 20 from a perspective of a target position 60, the visual scene 20 comprising the one or more objects 22. The content visualization stage 16 may further be configured to consider at least one of a lighting effect 24 and/or an object interaction effect 26 between the one or more objects 22 and one or more further objects contained in the visual scene 20.

The content visualization stage 16 may further comprise a target view synthesis stage 12 configured to obtain a target view image 32 from the set of images 30 irrespective of the geometry representation 40, wherein the target view image 32 represents the one or more objects 22 from the perspective of the target position 60. The content visualization stage 16 may further comprise a texture mapping block 18 being configured to map the target view image 32 on the geometry representation 40 under consideration of the target position 60.

In the following description of further figures, two digit references refer to FIG. 1.

3. Image of Several Objects According to FIGS. 2A and 2B

Figure 2A:
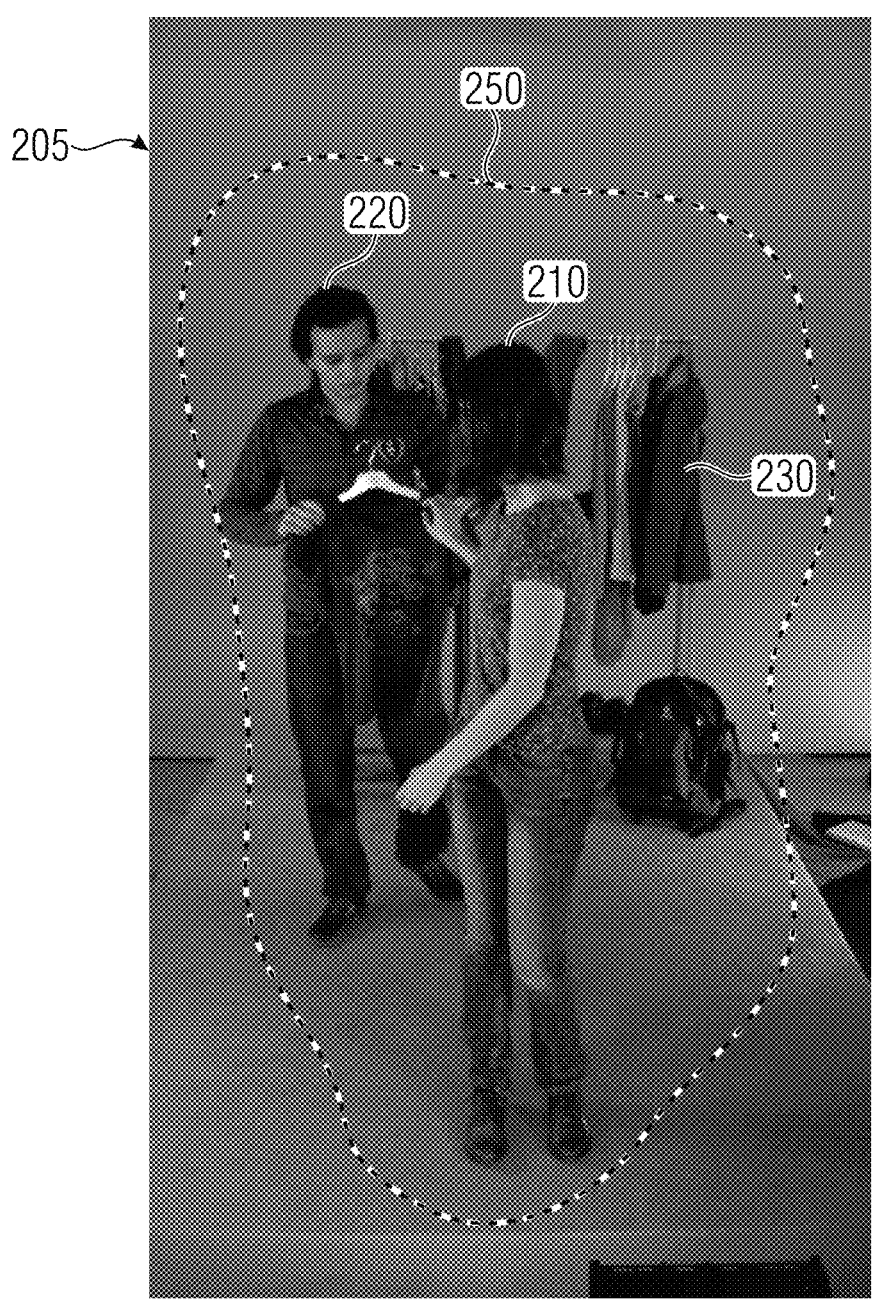
FIGS. 2A, 2B show an exemplary image of objects to be rendered in a scene.
Figure 2B:
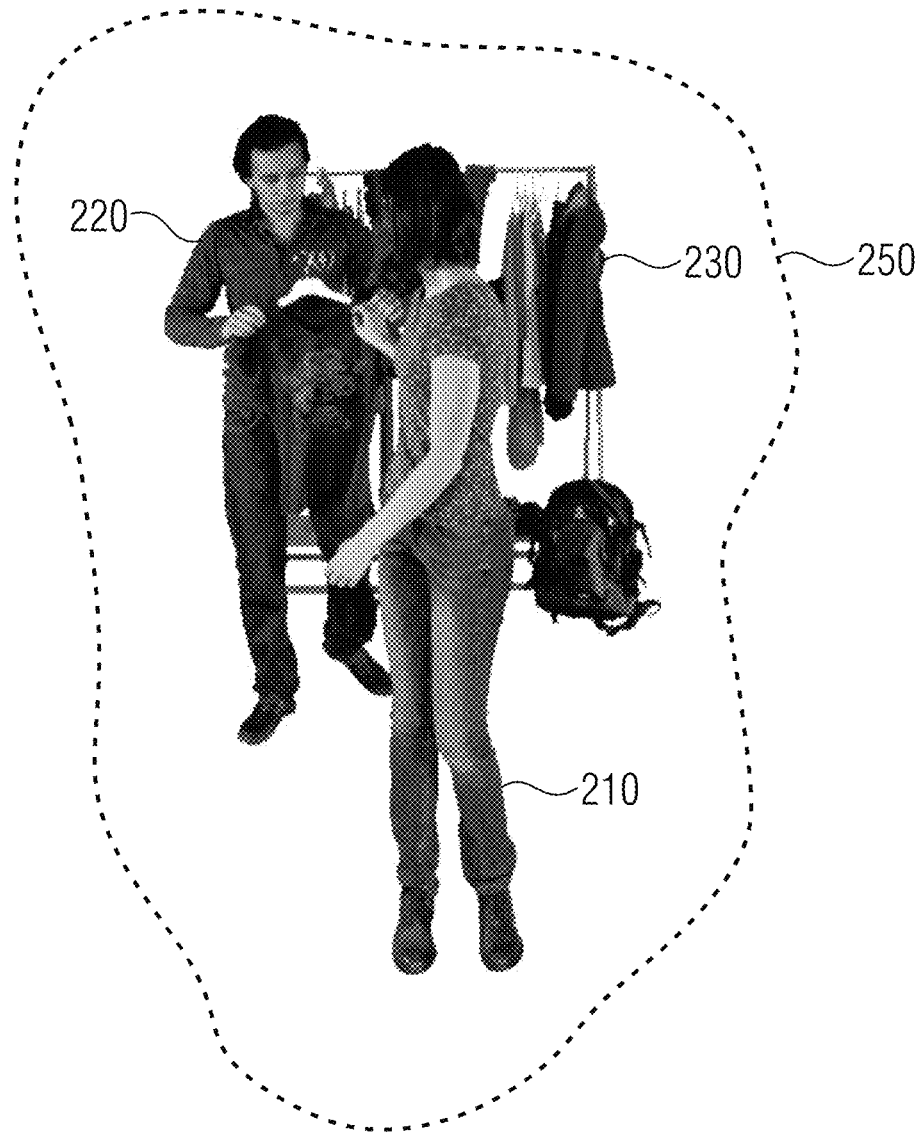

FIGS. 2A and 2B show an image 200 of an exemplary scene 250, the scene 250 comprising several objects 210, 220, 230, namely a first person 210, a second person 220 and a rack 230. The image 200 may be stored as a regular pixel array, comprising a plurality of pixels. Each pixel may comprise a texture information, comprising for example at least one of a color (for example RGB values), a material function, a depth value, or an alpha channel (a transparency value). FIG. 2A shows the image 200 as captured, i.e. the originally captured footage. However, some of the pixels of the image 200 may be marked as fully transparent, in order to exclude undesired background information, e.g. a green background in FIG. 2A. FIG. 2B shows the image 200 with the a background marked as fully transparent. That is, FIG. 2B shows the footage with an alpha channel computed by removing the green background. This masked image 200 may be used for further processing, e.g. for computing the target view image 32. The image 200 may be part of a sequence of images or a video The image 200 may be part of a set of images. Two or more images of the set of images may record the scene 250 from different perspectives. The arrangement of the cameras may follow a regular grid structure, but can also have an arbitrary position in 3D space. The image 200 may form or comprise a light-field representation of the scene 250, for example, the image 200 may comprise at least a texture map, comprising a texture information of a pixel array, and a depth map comprising a depth information for the pixel array. The set of images 30 may for example comprise one or more images 200, wherein the one or more image 200 show the scene 250 from different positions, i.e. from different perspectives. In this example, the one or more objects 22 may correspond to the objects 210, 220, 230.

Accordingly, the set of images 30 may be based on a light field representation or a multi camera representation of the one or more objects 22 and at least one of the images may comprise an image texture information and an image depth information.

The set of images 30 of the one or more objects may for example form or be derived from a light-field representation or a multi-camera representation of the one or more objects 22. The set of images 30 may comprise photo-realistic or high resolution images of the one or more objects 22. An image may be for example a two dimensional pixel map or a UV map. An image may comprise a texture or a texture map, a depth information or a depth map, a transparency information and/or a material function.

4. Apparatus for Rendering a Visual Scene According to FIG. 3

Figure 3:
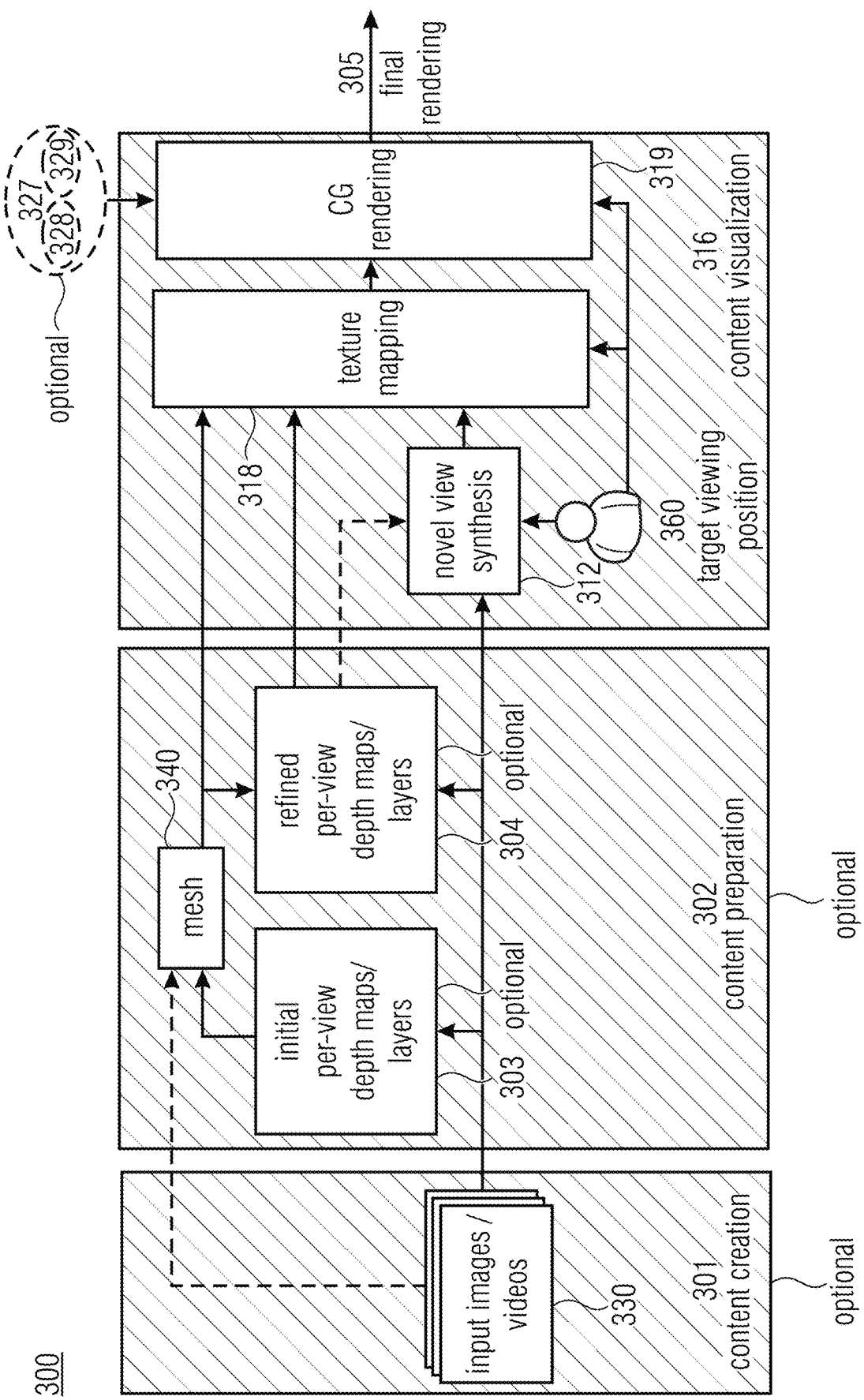
FIG. 3 shows a block diagram of a method for rendering a visual scene according to an embodiment.

FIG. 3 shows a block diagram of a method 300 for rendering a visual scene according to a non-limiting example. The method 300 may start with an optional content creation stage 301 providing a set of images 330 for a static scene or a set of videos 330 for temporally evolving scenes. Several images or videos may show or record the scene from different perspectives. For example, the set of images 330 may be formed by one or more images 200 of FIGS. 2A, 2B, wherein several images may show a scene, e.g. the scene 250, from different perspectives. The set of images 30 may correspond to the set of images 330.

In a subsequent optional step a mesh 340 is created that represents the content of the scene, e.g. the scene 250. The geometry representation 40 may comprise the mesh 340 but may also comprise another structure that represents the geometry and the position of the one or more objects 22.

Accordingly, the geometry representation 40 of the one or more objects 22 may form or comprise a mesh 340, the mesh 340 indicating a position of at least one of the one or more objects 22 within the visual scene 20 and a geometry of the at least one of the one or more objects 22.

Thus, the geometry representation 40 may provide the position of the one or more objects 22 with respect to another object, e.g. the CG object 26 or a CG light source 24 (FIG. 1). Knowing the position and the geometry of the one or more objects 22 may improve the consideration of interaction effects, such as lighting effects or object interaction effects.

Since the mesh 340 may only involve having a limited precision, it is also called proxy mesh in the following. The creation of the mesh 340 may be part of an optional preparation stage 302 and does not need to be performed during content visualization, but is an optional step. The generated mesh 340 needs not to be waterproof, i.e. the mesh 340 does not necessarily need to be a closed hull. However, the mesh 340 may be selected such that all visible object parts which it represents are enclosed by the mesh 340. The mesh 340 may enclose the object, e.g. the one or more objects 22. This may avoid difficulties for slanted observation angles as described above.

Accordingly, the mesh 340 may be a closed coarse hull enclosing the at least one of the one or more objects 22.

However, it may be sufficient, that the mesh 340 occludes the one or more objects 22 from the perspective of a target camera position, e.g. the target position 60, 360. In other words, the mesh 340 may indicate the geometry of the one or more objects 22 and the position of the one or more objects 22 within the visual scene 20. For example, the mesh 340 may comprise one or more planes, wherein a plane has a position in the 3D space and occludes one of the one or more objects 22.

Accordingly, the mesh 340 may be a three-dimensional structure.

The mesh 340 may be split into sub-meshes. For example, one sub-mesh may represent one of the one or more objects 22. In case a video sequence shall be processed, the mesh may need to evolve accordingly in time. The process how the mesh is created shall not be further specified. It may range from manual drawing over generation from CG scenes to the use of sophisticated photogrammetry methods. Moreover, initial per-view depth maps/layers generated from the input footage may be used to support the mesh creation, as indicated by block 303.

The content preparation stage 302 may optionally also include the generation of refined per-view depth maps/layers 304. These refined per-view depth maps/layers assign to each pixel and each camera view one or several depth values. The refined per-view depth maps/layers are created from the input images/videos by considering the mesh 340. The mesh 340 conveys global geometry information that can be advantageously used to compute local depth maps per view, the quality of which is superior compared to the initial per-view depth maps/layers [16]. In case this is not desired, the initial per-view depth maps/layers 303 may be used for the refined per-view depth maps/layers.

In other words, the initial per-view depth maps/layers 303 may be, for example, a set of depth maps comprising a depth information for the set of images 30. The geometry representation 40 may be used to improve the depth information of the set of depth maps, resulting in the refined per-view depth maps/layers 304. The initial per-view depth maps/layers 303 or the refined per-view depth maps/layers 304 may be used for obtaining the target view image 32, e.g. for obtaining a texture of the target view image 32 or for obtaining a depth map or a depth information of the target view image 32. Using the improved refined per-view depth maps/layers 304 for obtaining the target view image 32 may result in a more precise depth map or depth information of the target view image 32. Additionally or alternatively, the refined per-view depth maps/layers 304 may be used in the texture mapping block 18 of the apparatus 10 or the texture mapping block 318 of the method 300.

The method 300 may comprise a step of content visualization 316, which may be executed by the content visualization stage 16. In the content visualization step 316, the user may observe the footage, e.g. the visual scene 20, from a certain target position 360, which may correspond to the target position 60. The target position 360 may be the current location of the user in a VR experience, but can also be a virtual camera that may be used for special effects in movie production.

The content visualization step 316 comprises a target view synthesis step 312, which may also be referred to as novel view synthesis stage 312. Based on the provided input images or videos 330, the novel view synthesis stage 312 computes an image that corresponds to what a camera would have seen at the target viewing position 360. The novel view synthesis stage 312 may be executed by the target view synthesis stage 12. Such a novel view synthesis 312 may, for instance, be performed using image based rendering, DIBR, multi-plane images, or any other method. The result of the target view synthesis 312 is the target view image 32. The target view image 32 may for example be a pixel image or a pixel array, wherein a pixel of the pixel image or pixel array may comprise a texture information and/or a depth information.

For example, the set of images 330 may comprise one or more photo-realistic or high-resolution images representing or showing the one or more objects 22 from the perspectives of one or more camera positions. The target view synthesis step 312 may obtain a target view image 32 comprising a photo-realistic or high-resolution image representing or showing the one or more objects 22 from the perspective of the target position 60, 360, which may be different to any of the camera positions.

The generated novel view, e.g. the target view image 32, is then mapped to the created mesh 340. This mapping assigns each rendered pixel with a point on the mesh. In a first approach, this may mean that each rendered pixel is associated to a point in 3D space. Since, however, in a subsequent step this 3D point will be projected later on onto a 2D image place, the mapping may also take place directly in the 2D space. More details about this step can be found the description of FIG. 4. Finally, the whole scene including potential other CG objects, e.g. the CG object 26, may be rendered by a traditional CG rendering pipeline. This rendering may also include computation of so called material functions that may alter the visual appearance of any object surface, e.g. a surface might appear specular or glossy.

The content visualization stage may further comprise, as a further step, a CG rendering 319. The CG rendering 319 may be configured to obtain or get as an input a computer generated object representation 327. The computer generated object representation 327 may comprise a computer generated object mesh 328 of the CG object 26 describing a position of the CG object 26 within the visual scene 20 and further describing a geometry of the CG object 26. Additionally or alternatively, the computer generated object representation 327 may further comprise a computer generated object texture map 329 which may comprise a texture information of the CG object 26.

Figure 4:
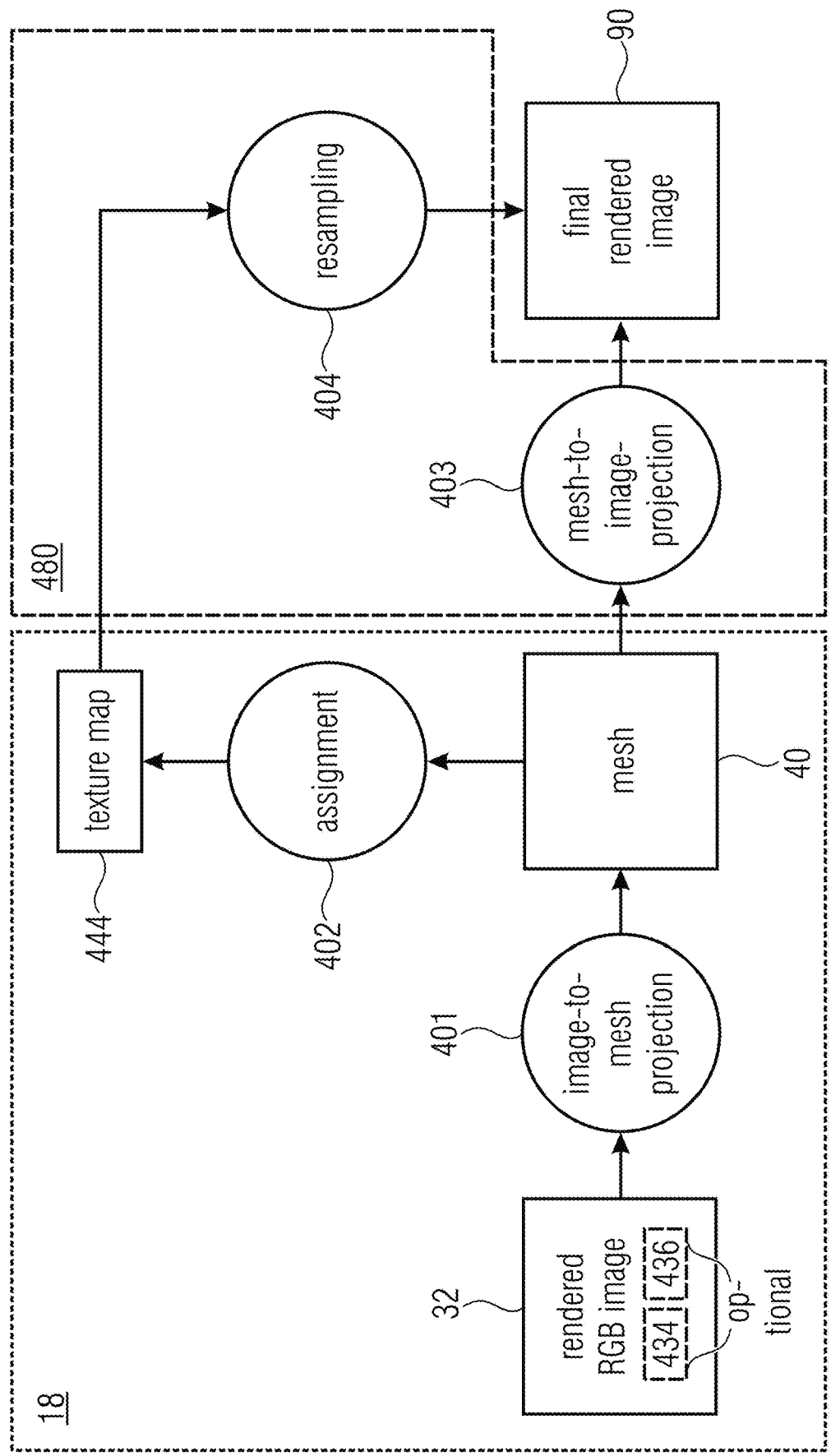
FIG. 4 shows a schematic representation of a texture mapping block of an apparatus for rendering visual content according to an embodiment.

The method step of CG rendering 319 may be executed by a final renderer 480 (c.f. FIG. 4) which may be part of the content visualization stage 16 of the apparatus 10 or which may be an additional feature of the apparatus 10. The final renderer 480 may comprise equal or equivalent features as the above described step of CG rendering 319.

In other words, the content visualization stage 16 may be configured to obtain at least one computer generated object representation 327 comprising a computer generated object mesh 328 and a computer generated object texture map 329.

The CG rendering 319 may further be configured to obtain an image of the CG object 26 from the perspective of the target position 60 (FIG. 1), 360 (FIG. 3) by projecting the computer generated object representation 327 to the final image 90. Alternatively, projecting the computer generated object representation 327 to the final image 90 may also be performed by a step of final rendering 305.

The CG rendering 319 may further obtain the geometry representation 40, 340 as an input. By considering the combination of the geometry representation 40, 340 and the computer generated object mesh 328, the CG rendering 319 may consider object interaction effects between the one or more objects 22 and the CG object 26. An object interaction effect may for example be an occlusion. The CG rendering 319 may consider occlusions between the one or more objects 22 and the CG object 26 based on the target position 60, 360.

Further, the CG rendering 319 may obtain an illumination of the visual scene 20. For example, the CG rendering 319 may obtain a lighting effect 24, which may be a lighting effect due to a CG light source that may be part of the visual scene 20. Such a lighting effect 24 may be an illumination of the one or more objects 22 and/or a CG object 26. The lighting effect 24 may comprise at least one of reflections, specularities and shades. The lighting effect 24 may consider several different objects, e.g. one or more CG objects 26 and/or one or more objects 22. For example, a light ray may be reflected from one object and hit another object, so that it illuminates the other object. Further, a shadow of one object may fall onto one or more other objects. The CG rendering 319 may be configured to consider these lighting effects 24. For example, the CG rendering 319 may use the geometry representation 40 and/or the computer generated object mesh 328 to obtain the lighting effect 24, e.g. by raytracing of geometry projection. The CG rendering 319 may be configured to adapt a texture information of an object, e.g. the computer generated object texture map 329 or the mesh texture map 444 (c.f. FIG. 4) of the geometry representation 40, 340, according to a lighting effect 24.

Accordingly, the content visualization stage 16 may be configured to obtain an illumination information for a point on the geometry representation 40, and the content visualization stage 16 may be configured to use the illumination information to adapt the mesh texture map 444 of the geometry representation 40.

The step described by the CG rendering 319 or parts of the step described by the CG rendering 319 may be combined with the texture mapping step 318. For example, adapting the mesh texture map 444 (c.f. FIG. 4) according to a lighting effect may be combined with the texture mapping 18.

Optionally, the content visualization stage 316 may be configured to obtain a final rendering, which may be a finally rendered image. Thus, the method 300 may optionally comprise a further step of final rendering 305 yielding a rendered image. The step of final rendering 305 may, for instance, yield the final image 90 based on the mesh texture map 444 and the computer generated object texture map 329. For obtaining the final image 90, the step of final rendering 305 may further project the geometry representation 40 and optionally also the computer generated object mesh 328 to the final image 90 based on the target position 60, 360.

The following description explains the function of the rendering concept based on a single scene element, which serves as an example for the one or more objects 22. For this scene element 22, a proxy geometry, e.g. a geometry representation 40, which may comprise a mesh 340, as well as an LFR, which is an example for the set of images 30, is available; or the preparation procedure (the content creation stage 301 and/or the content preparation stage 302) creates the data that may be used, i.e. the geometry representation 40 and the set of images 30. For example, such a scene element 22 may consist of a single object, a single person, several persons or any other combination.

Such an approach allows considering several interactions between the rendered light-field content, i.e. the one or more objects 22, and the remaining CG objects 26, representing thus immediate advantages of the proposed method: The mapping of the rendered pixel to the proxy geometry allows computing occlusions between CG objects 26 and objects 22 visualized by the light-field. This is particularly beneficial in case the depth used for depth image based rendering, i.e. the target view synthesis 17, is not very precise or even not existing due to the use of geometry-less image-based rendering.

The proxy mesh 40, 340 may be used to compute intersections during raytracing. The latter can be used to create photorealistic images by sending out rays that are associated to a specific pixel in the target image.

The objects intersected by this ray will then be depicted by the pixel. Moreover, the raytracing algorithm continues to walk back the ray in opposite direction of light-propagation to compute all light reflections and to finally determine the light sources that are illuminating the intersection points. A priori, neither image based nor depth image based rendering are compatible with such a workflow, because the objects need to be located in 3D space. While the rendered pixels can be converted into a point cloud using the depth value of every pixel, intersection of rays with point-clouds is computationally expensive. With the proposed method, the rays may be intersected with the proxy mesh, which is much easier. The texture generated by the novel view synthesis 312 in FIG. 3 will then define the color of the object. It is even possible to include view dependent appearance by using a camera that is located close to the ray for which the intersection is computed. We have to note, however, that a larger number of cameras also increases the computation time that may be taken. This can be mitigated by reducing the number of cameras, and by blending the pixel values obtained from several cameras for each ray to compute.

The geometry of the proxy mesh 340 can be used to compute the light that falls on the light-field objects 22 from CG light sources 24. In one embodiment, this may be achieved by ray-tracing techniques, where rays are casted from the proxy mesh 340 towards every existing light-source in the scene, and where it is checked whether the ray can travel freely in space or whether it is blocked by another object. In another embodiment, ray marching in 2D space may be used instead of raytracing. This is achieved by projecting each ray into the 2D image space, and then walking along this ray in the direction of light-propagation. Based on the depth values of each pixel, it can then be determined whether an object surface has been traversed. In such a case, the ray marching for the considered ray is stopped, and the identified pixel that is estimated to intersect with the ray is considered to be illuminated by the light-ray. Both ray-tracing and ray-marching are however computationally expensive. Moreover, computing the object intersections cannot be solved uniquely. In a third embodiment, the scene may be rendered for a camera that has the same position than the light source. Every proxy mesh element visible in such a camera is then also lit by the associated light-source. In this case, having the proxy mesh 340 provides the benefit that rendering is faster, because only a coarse proxy mesh 340 needs to be rendered instead of every single 3D point associated to each rendered light-field pixel.

These benefits are combined with the general advantages of (depth) image based rendering:

View-dependent effects as contained in the input footage may be preserved.

High quality rendering without geometric simplifications, i.e. the target view image 32 may be obtained without suffering of geometric simplifications which may be inherent to the geometry representation 40.

The content visualization stage 316 may solve the question, how (depth) image based rendering can be combined with CG rendering while maintaining photorealism and interaction with traditional CG objects. In more detail, content visualization 316 may be performed by the following steps:

Rendering 312 of an image, e.g. the target view image 32, from the multi-camera representation 330, such that the rendered image 32 corresponds to an image that a camera at the target viewing position 360 would have seen. In other words, the rendering algorithm needs to generate a novel view for a camera whose extrinsic and intrinsic parameters correspond to the target camera. In the following, the result, which may correspond to the target view image 32, is also called rendered RGB image 32. The rendering algorithm itself may use depth values or not.

Use 318 the rendered RGB image 32 as texture for the proxy mesh 340 based on a mapping function. This mapping function maps the pixels of the rendered RGB image 32 to points of the mesh 340, and by these means to points in the final rendering 305. More details on this texture mapping step 318 are explained in the description of FIG. 4

Process all unassociated mesh pixels to which no pixel of the rendered RGB image 32 has been assigned as explained in Section 7.

5. Texture Mapping Block According to FIG. 4

FIG. 4 shows a schematic representation of the texture mapping block 18. Texture mapping 18, assigns the pixels of the target view image 32, which may be a rendered RGB image, to mesh polygons, which may be parts of the geometry representation 40 or the mesh 340. The target view image 32 may comprise a texture map 434, for example a pixel array with color or texture information, and a depth map 436. The depth map 436 may for example be obtained by the target view synthesis stage 12, for example from the initial per-view depth maps/layers 303 or the refined per-view depth maps/layers 304 (c.f. FIG. 3).

Accordingly, the target view image 32 may comprise a target view texture information 434, e.g. RGB values, which may be stored in a texture map, and a target view depth information 436, which may be stored in a depth map.

The texture mapping block 18 may comprise an image-to-mesh projection 401, which maps a point of the target view image 32 on a point of the geometry representation 40. The image-to-mesh projection 401 may be thought of displaying the image on the mesh using an overhead projector.

Conceptually, the target view image 32 is projected onto the geometry representation 40, e.g. a mesh 340, which is then after some possible additional processing projected back into an image, e.g. a final image 90. In practice, the texture of a mesh is stored in form of a texture map 444 (see Section 1). Each mesh polygon has an associated region in this texture map 444 where its texture is stored.

Thus, the texture mapping block 18 may further comprise an assignment 402, which defines the mapping of a mesh polygon, i.e. a part of the geometry representation 40, to a region in a texture map 444.

Obtaining the final image 90 may comprise a mesh-to-image projection 403, which may be thought of filming the mesh 40, 340 from the considered target camera view 60.

The mesh-to-image projection 403 may be executed by a final renderer 480. The final renderer 480 may be configured to project the geometry representation 40 in the final image 90 based on the target position 60, i.e. by using the perspective of the target position 60. When projecting the geometry representation 40 to the final image 90, the final renderer 480 may include further CG objects 26 optionally comprised in the visual scene 20, such that object interaction effects may be considered. In other words, the final renderer may project the visual scene 20 to the final image 90 from the perspective of the target position 60.

The final renderer 480 of the apparatus 10 may be configured to execute the above described method step of final rendering 305 yielding a finally rendered image, e.g. the final image 90.

Consequently, rendering the image, e.g. an image of the visual scene 20, to a final image 90 can be realized by projecting 403 the mesh into the image to determine which polygons are visible, followed by a resampling 404 of the appropriate region of the texture map 444 into the final rendered image.

In other words, the resampling 404 maps a point of the final image 90 on a point of the texture map 444. However, not every valid point of the texture map 444, which was mapped on the geometry representation 40, is necessarily mapped on the final image 90. Usually, only a point of the geometry representation 40, which is visible in the final image 90 may be mapped by the resampling 404.

Accordingly, the apparatus 10 may further comprise a final image renderer 480, wherein the final image renderer 480 may be configured to project the geometry representation 40 of the one or more objects 22 and optionally the computer generated object mesh 328 of the at least one computer generated object representation 327 into a final image 90 under consideration of the target position 60. The final image renderer 480 may further be configured to obtain a texture of the final image 90 by using a mesh texture information 444 of the geometry representation 40 of the one or more objects 22 and the computer generated object texture map of the at least one computer generated object representation 327.

In the texture mapping block 18, different implementations of the assignment 402 are possible, wherein the different implementations of the assignment 402 may include different implementations of the texture map 444

In explicit texture projection, the rendering engine executing the texture mapping 18, e.g. the assignment 402, explicitly replaces the original color information (texture) of the proxy mesh 340 with the color information from the rendered RGB image 32. This works for all parts of the proxy mesh 340 visible in the target camera view 60, 360. It improves, inter alia, the realism of indirect illumination effects, while also the normal image may be improved.

In other words, the proxy mesh 340 or the geometry representation 40 obtained by the content visualization stage 16 may comprise a texture information that may be stored in a texture map of the geometry representation 40. Thus, the texture mapping block 18 may replace the texture information in the texture map of the geometry representation 40 by a texture information of the target view image 32, wherein the mapping of a pixel of the target view image 32 to a pixel of the texture map of the geometry representation may be provided by the image-to-mesh projection 401.

Alternatively, the texture mapping 18 may be implemented as implicit texture projection in a deferred shading pipeline. This is, the rendering engine may compute the shading pass and other passes based on the proxy geometry, e.g. the geometry representation 40, and the associated texture, e.g. a texture map 444 of the geometry representation 40. A specialized material function then combines the shading pass, the RGB image 32 rendered from the LFR and possibly other render passes to define the final look of the material. The effect of artificial lights is hence computed based on the proxy geometry 40 and its texture, the final color and appearance of the object is based on the rendered RGB image 32 and the material function. This is exemplified in more detail in section 8.

As explained above, meshes 340 used for projection may describe the real object 22 only in a coarse manner. This may make the image-to-mesh projection 401 a bit more complex than usual. This aspect will be explained with reference to FIG. 5.

After the texture mapping, i.e. for example the assignment 402, as discussed above not necessarily all polygon points have an associated texture pixel from the rendered RGB image 32. This may occur due to the following reason: As the proxy mesh 40 is only a coarse approximation of the real object geometry of the object 22, it may happen that not all polygon points have an associated texture generated from the rendered RGB image 32. This can be easily solved by making all polygon points of the proxy mesh 40 without an associated texture pixel transparent. By these means, the parts of the mesh that exceed the real object may be invisible in the final rendering 305 and/or the final image 90.

6. Image-to-Mesh-Projection According to FIG. 5

Figure 5:
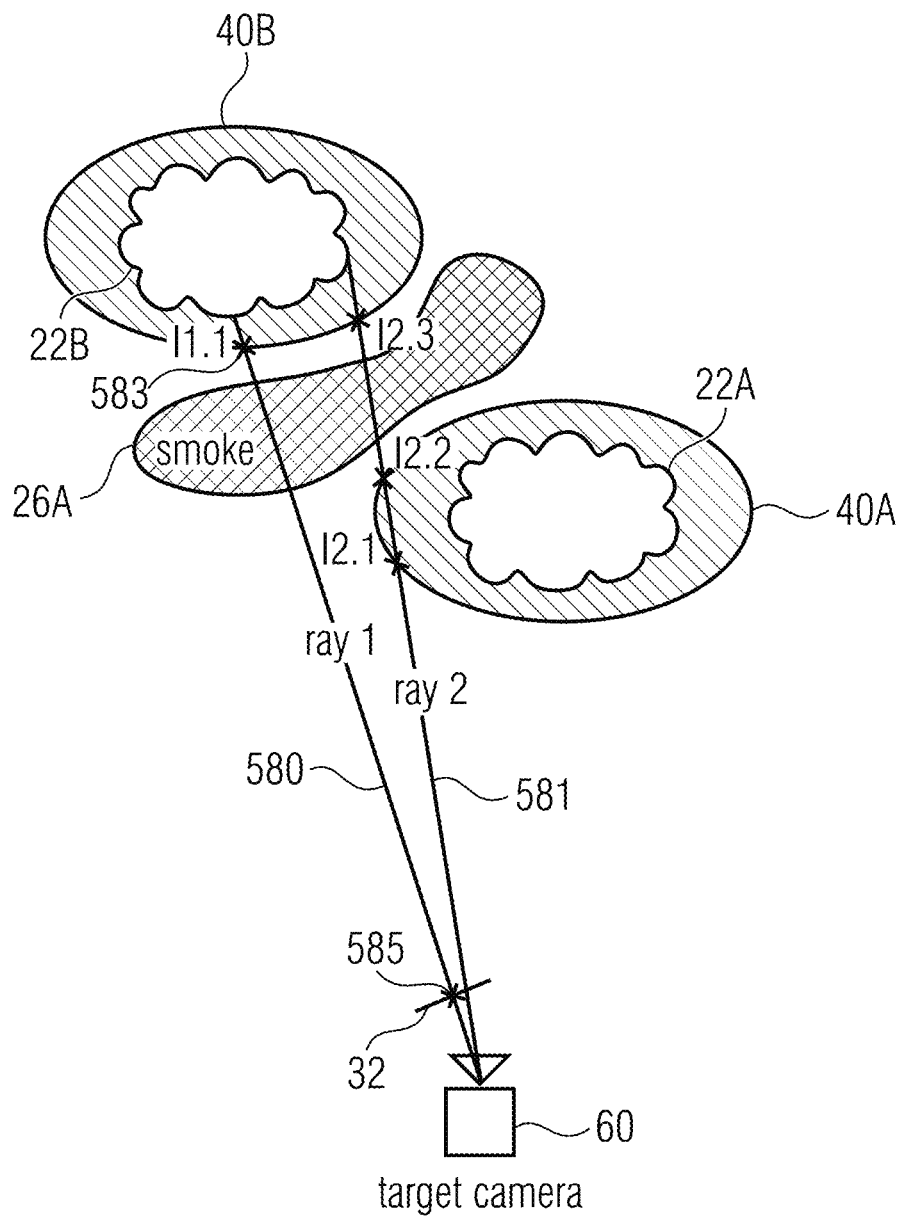
FIG. 5 shows a scheme of an image-to-mesh-projection according to an embodiment.

FIG. 5 shows a scheme of the image-to-mesh-projection 401. The scheme shows two objects 22A, 22B of the one or more objects 22. The objects 22A and 22B are represented by the geometry representations 40A and 40B, respectively, which may be mesh hulls.

FIG. 5 further shows an object 26A, which may be a CG object. Accordingly, FIG. 5 shows two objects 22A, 22B, each surrounded by one mesh 40A, 40B. For rendering, these meshes 40A, 40B will be textured based on the target view image 32 synthesized based on the depicted target camera 60. The target view image 32 may have been created beforehand by corresponding novel view synthesis 12, 312. FIG. 5 further shows a ray called 'ray 1', which may be represented by a straight line 580. The line 580 may be a mean to project a point 585 of the target view image 32 onto a point 583 of the geometry representation 40, e.g. the geometry representations 40A, 40B. The line 580 may be defined by the target position 60 and the point 585. The intersection point 583 of the line 580 and the geometry representation 40B may be the point, onto which the point 585 of the target view image 32 is mapped.

Accordingly, the texture mapping block 18 may be configured to map a point 585 of the target view image 32 on a point 583 of the geometry representation 40 by obtaining at least one intersection point of a straight line 580 with the geometry representation 40, the straight line 580 passing through the target position 60 and through the point 585 of the target view image 32.

In particular in the case of coarse meshes, there might be more than one intersection point of a ray with the geometry representation 40, as may be seen on object 22A. A pixel, e.g. a pixel of the target view image 32, associated with 'ray 1' 580 will be projected on an intersection point 'I1.1'. A second ray, namely the depicted 'ray 2' represented by line 581, however, exemplarily has three relevant intersection points, namely 'I2.1', 'I2.2' and 'I2.3'.

Since the mesh-hulls 40A, 40B may be defined to be transparent, if no texture is projected onto them (c.f. the end of Section 5), each of these intersection points 'I2.1', 'I2.2', 'I2.3' can be used from a pure view rendering point. In other words, whatever intersection point 'I2.1', 'I2.2', 'I2.3' may be chosen, the final image 90 will be the same as long as no further interaction with remaining CG objects 26 occurs and as long as the object 22A, 22B is shaded unlit. Otherwise selecting any different intersection point than 'I2.3' might lead to artefacts. This can for instance be seen when putting a CG object, e.g. artificial smoke 26A, between object 22A and object 22B. Since 'I1.1' is located behind the smoke, the object point described by 'ray 2' 581 should also be located behind the smoke, because it belongs to the same object. When however using 'I2.2' or 'I2.1', it will be situated in front of the smoke, leading to an unnatural image representation.

Unfortunately, the traditional projection techniques will end up with projecting the pixel value on 'I2.1'. If the pixel value projected on 'I2.1' has no transparency, 'I2.1' will occlude 'I2.2' and 'I2.3'. Consequently, some implementations may decide to project the pixel value also on 'I2.2' and 'I2.3', since this avoids an additional if-condition without having too many negative effects.

To solve this problem, the image-to-mesh projection 401 may use a depth based projection. In fact for every pixel the image-to-mesh projection 401 also disposes of one (or several) depth values. Such depth values can be generated by warping the depths of the input views 30 to the position of the target view 60. This may be done for example by the target view synthesis stage 12. For example, the target view depth information 436 may comprise depth values which may be used for the image-to-mesh projection 401. Hence, one could for instance select those mesh intersection points whose depth value is closest to the depth value of the pixel to map.

In other words, for selecting a proper intersection point, to which the point 585 of the target view image 32 should be mapped, from the intersection points 'I2.1', 'I2.2', 'I2.3', a depth value of the point 585, e.g. depth value of a pixel of the depth map 436, may be compared to depth values of the intersection points 'I2.1', 'I2.2', 'I2.3' which describe the position of the intersection points 'I2.1', 'I2.2', 'I2.3' in 3D space. Thus, the intersection point with a depth value closest to a depth value of the point 585 may be chosen. For multiplane images as described above, one pixel of the reference camera 60 can have a multitude of RGB and assigned depth values. In this case, different RGB values can be assigned to different mesh intersection points 'I2.1', 'I2.2', 'I2.3'. In case the image-to-mesh projection 401 uses a depth map, e.g. the target view depth information 436, it may also be called depth-based texture mapping 401.

Accordingly, the texture mapping block 18 may be configured to use the target view depth information 436 for selecting a point 583 of the geometry representation 40 on which a point 585 of the target view image 32 is mapped.

The depth maps used for the selection of the mesh intersection points not necessarily need to be used for the rendering, i.e. the target view synthesis 12, 312. For instance, an image based rendering without any depth map may be used for view rendering, e.g. the target view synthesis 12, 312, while texture mapping 18, 318 can still profit from such a depth map. Alternatively, view rendering, e.g. the target view synthesis 12, 312, can use a strongly quantized depth map, while texture mapping 18, 318 uses less quantization, but more blur to avoid artefacts in challenging objects like fine grained elements.

Figure 6A:
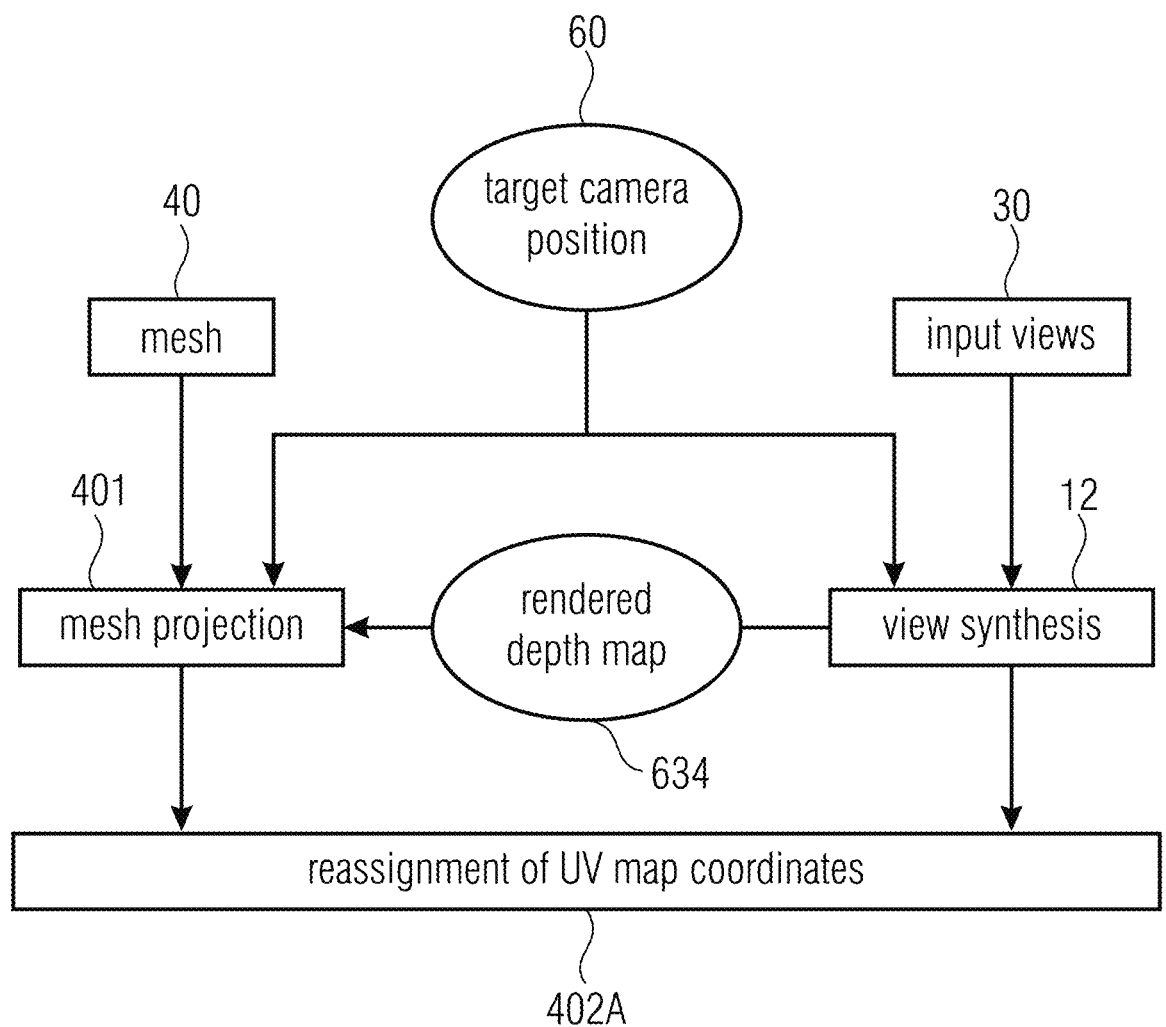
FIGS. 6A, 6B show tow block diagrams of a texture mapping block of an apparatus for rendering visual content according to two embodiments.
Figure 6B:
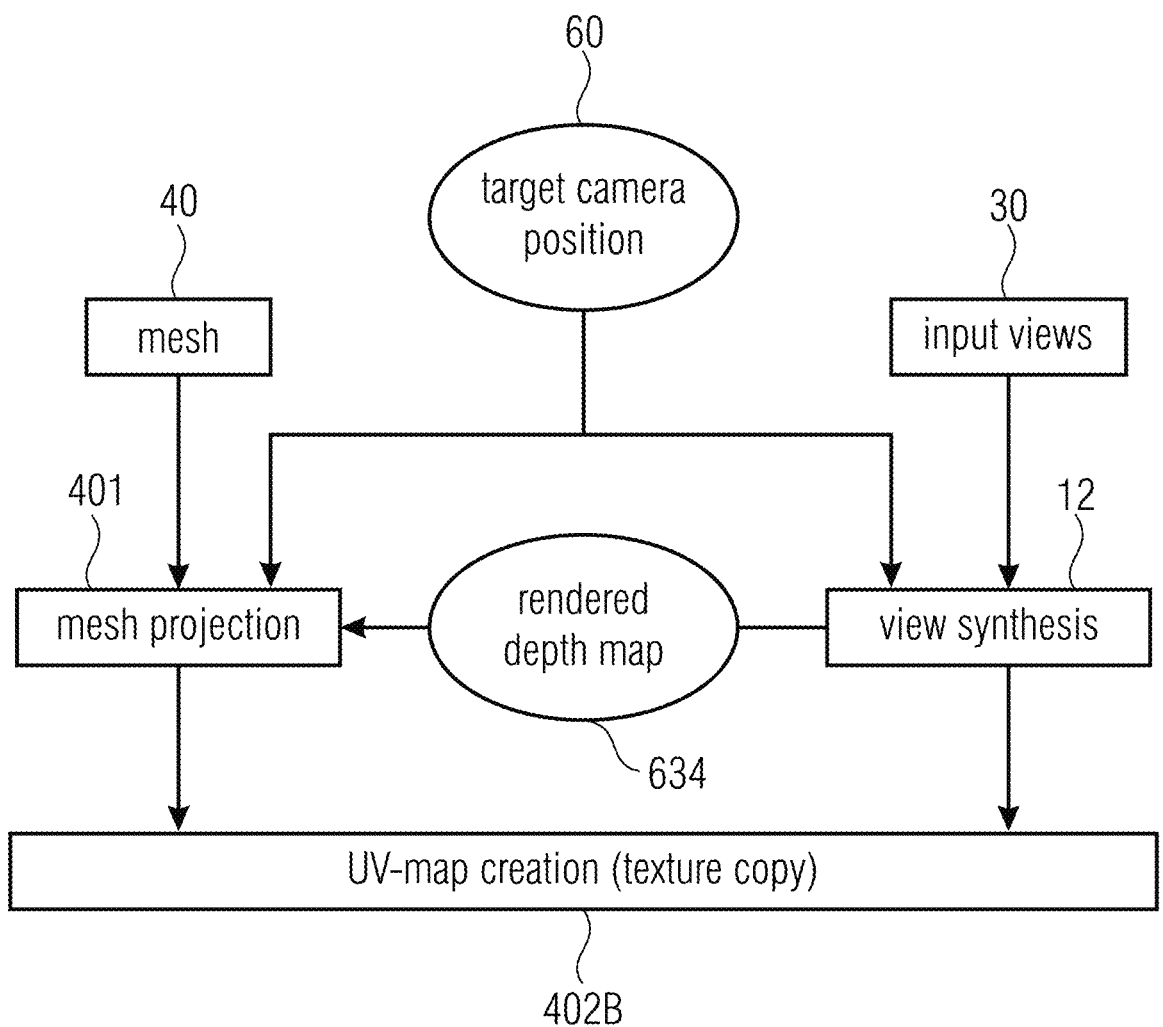

7. Implementation of Texture Mapping in 3D Space According to FIGS. 6A and 6B FIGS. 6A, 6B show block diagrams of two implementations of the texture mapping block 18. From the input views 30, a novel view 32 for the target camera position 60 may be synthesized by the target view synthesis stage 12. At the same time, a depth map 634 for this rendered view 32 may be generated. Then, the proxy mesh 40 may be projected to the target camera view 60 as well. The input of the rendered depth map 634 may help to select the relevant mesh polygons in case they occlude each other (see Section 6). Textures of 3D meshes, e.g. the mesh 340 or the geometry representation 40, are typically stored in form of texture maps, e.g. the texture map 444, also called UV-maps (see Section 1).

One possible way to map the light-field or the target view image 32 onto the mesh-hull is to recreate a UV map for every desired target camera position 60. In other words, one possibility for obtaining the texture map 444 (c.f. FIG. 4) is to project the light-field onto the mesh-hull by UV map assignment, as shown in FIG. 6A. This is, the rendered view, i.e. the target view image 32, or a texture map of the rendered view, i.e. the target view texture information 434, may be considered as UV-map or texture map 444 for the mesh 40, which is mapped to the mesh polygons, by an assignment 402A, which may be a possible implementation of the assignment 402. By these means only mesh points not occluded by another mesh element of the same proxy geometry 40 will obtain a valid colour value.

Accordingly, the described embodiment of the content visualization stage 16 is configured to first render a target view image 32, followed by a creation 402A of a novel UV-map layout, e.g. a layout of the texture map 444.

In other words, the texture mapping block 18 may be configured to use the target view texture information 434 as a mesh texture map 444 for the geometry representation 40, and the texture mapping block 18 may be configured to map a point of the geometry representation 40 to a point of the mesh texture map 444.

Alternatively, the texture map 444 may be obtained by projecting the light-field onto the mesh-hull by texture copy, as shown in FIG. 6B. Instead of reassigning the texture maps, e.g. the target view texture information 434, to the mesh polygons, the light-field, i.e. the target view image 32 or the target view texture information 434, may be copied into an existing texture or UV map, e.g. a mesh texture map 444 which may have been obtained by the content visualization stage 16. According to this embodiment, the rendered RGB image 32 may be copied into an existing texture 444 using corresponding homographies. These homographies may differ for each face of the mesh. In other words, an existing UV layout, e.g. of the texture map 444, may be used and the synthesized view 32 is fit into the existing UV layout.

Accordingly, the geometry representation 40 may comprise one or more mesh texture maps 444, and the texture mapping block 18 may be configured to obtain a mesh texture information for the mesh texture map 444 by mapping the target view texture information 434 on the one or more mesh texture maps 444.

According to the embodiment shown in FIG. 6B, the mesh 340 or the geometry representation 40 may be a geometry being more complex than a simple plane, e.g. a 3D structure, e.g. at least two planes positioned in the 3D space such that four points distributed on the at least two planes may form a 3D structure. The geometry representation 340 may, for example, consist of multiple polygons (mesh elements). A 3D structure of the geometry representation 40 may involve a more complex projection technique compared to a 2D mesh, in that each mesh polygon is projected onto the view-rendered image 32 to identify the texture. However, a 3D structure of the geometry representation 40 may supports arbitrary camera layouts 60, as well as correct occlusion and illumination simulations, because the mesh 340 represents the geometry of the light-field content 22 in a much better way than a simple plane.

The implementation methods described in this section may be performed in the 3D space, giving the highest flexibility, because the rendered RGB image 32 is implicitly projected back into 3D space, such that proper shadows and interactive illumination may be computed.

8. Implementation in 2D Space According to FIG. 7

Compared to an implementation of the texture mapping block 18 in 3D space, computation power may be saved by implementing the texture mapping block 18 in 2D space. Even for traditional CG rendering, many operations may be performed in 2D image space (or screen space) to speed up computation. This typically leads to deviations from the physically correct behaviour, but in many cases it is good enough to achieve a convincing illusion.

Figure 7:
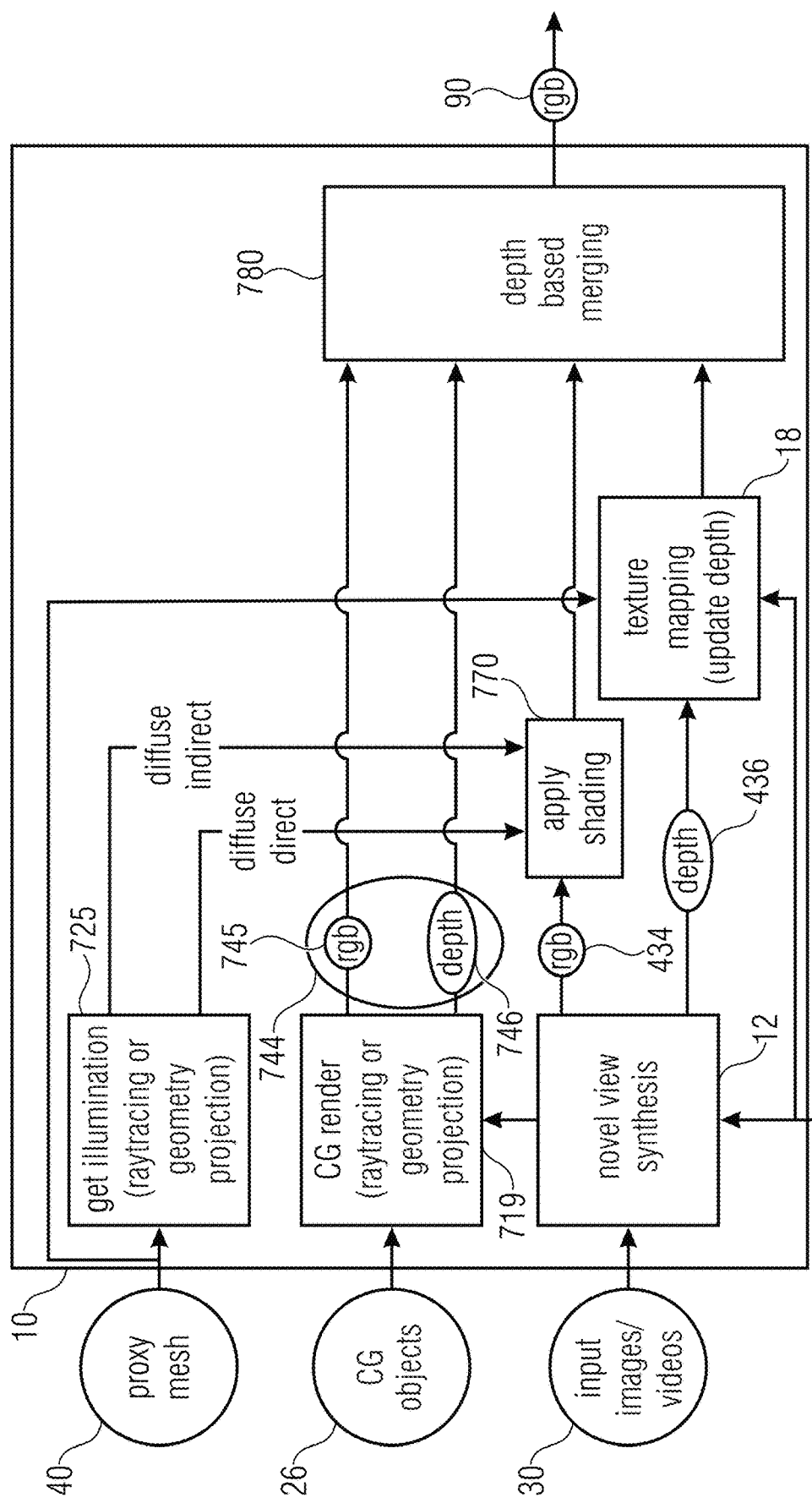
FIG. 7 shows a schematic representation of an apparatus for rendering a visual scene according to another embodiment.

FIG. 7 shows a schematic representation of an embodiment of the apparatus 10, following a similar approach. However, the exact implementation may depend on the optimization strategy. For example, the texture mapping may be implemented in 2D space using render passes. The novel view synthesis block 12 may correspond to the target view synthesis stage 12 (FIG. 1), or may execute the step of the novel view synthesis stage 312 (FIG. 3) and may transform the input images 30 into a perspective seen from the target camera position 60. The texture mapping block 18 may correspond to the texture mapping block 18, 318 (FIGS. 1, 3). However in this embodiment it may be executed in the 2D space. To this end, it may update a depth value, e.g. a value of the target image depth information 436 of the rendered RGB image, e.g. the target view image 32, such that the pixels are effectively located on the proxy geometry, e.g. the geometry representation 40.

In other words, the depth information provided by the geometry representation 40, which may be more precise than the target view depth information 436, may be used to adapt or update or replace the target view depth information 436. Alternatively, the depth information provided by the geometry representation 40 may provide a depth information, e.g. the target view depth information 436, for the target view image 32, e.g. in case the target view image 32 does not comprise a target view depth information 436. Thus, a projection of the target view image 32 or the target view texture information 434 on the mesh texture map 444 may be unnecessary.

Accordingly, the texture mapping block 18 may be configured to use the geometry representation 40 to obtain a depth information 436 for the target view image 32, wherein the target view image 32 comprises a target view texture information 436.

Further elements of the visual scene 20 besides the one or more objects 22, such as the CG object 26, may be rendered with normal computer graphics. For example, the content visualization stage 16 may comprise a CG renderer 719, which may be configured to render the CG object 26, for example by raytracing or by geometry projection. The CG renderer 719 may be configured to project the CG object 26 to the visual scene 20 based on the target position 60. The CG renderer 719 may provide a CG object image 744 of the CG object 26, the CG object image comprising a CG object texture information 745 and a CG object depth information 746.

In other words, the content visualization stage 16 may be configured to obtain at least one computer generated object image 744 under consideration of the target position 60, wherein the at least one computer generated object image 744 comprises a computer generated object texture information 745 and a computer generated object depth information 746.

In this embodiment, the RGB image 32 may not be transferred back into a texture map, but may directly be propagated to the final output. In other words, the target view image 32 may remain in the 2D space for rendering the final image 90. Therefore, the CG renderer 719 may be independent of the geometry representation 40, e.g. a proxy mesh 340.

As the rendered RGB image is not necessarily transferred back into the 3D space, but may remain in the 2D space, indirect illumination and shadowing may be taken into account indirectly. For this purpose, the content visualization stage 16 may comprise an illumination handler 725, which may be configured to obtain the lighting effect 24 or illumination effects such as illumination, shadows, reflections and/or specularities, e.g. by using methods such as raytracing or geometry projection. For example, the illumination handler 725 may be configured to obtain a lighting effect 24 due to a CG light source. The illumination handler 725 may be configured to obtain an incident illumination (and shadowing) on the proxy mesh, e.g. the geometry representation 40. The content visualization stage 16 may comprise an illumination applying block 770, which may be configured to apply the incident illumination obtained by the illumination handler 725 to the rendered RGB texture 434, e.g. by adapting a texture value.

In other words, the content visualization stage 16 may be configured to obtain an illumination information for a point on the geometry representation 40, e.g. by raytracing or by geometry projection and the texture mapping block 18 may be configured to use the illumination information to adapt the target view texture information 434.

The content visualization stage 16 may further comprise a final image renderer 780, which may be configured to obtain a final image 90. The final image renderer 780 may obtain the final image 90 based on the target view texture information 434, which may have been updated by the illumination applying block 770, before being provided to the final image renderer 780. Further, the final image renderer 780 may obtain the final image 90 based on the target view depth information 436, which may have been modified by the texture mapping block 18, before being provided to the final image renderer 780. The final image renderer 780 may be configured to obtain the computer generated object image 744. The final image renderer may be configured to obtain the final image 90 by merging the CG object texture information 745 with the target view texture information 434 under consideration of the CG object depth information 746 and the target view depth information 436. For example, the final image renderer 90 may be configured to select a texture information for a pixel of the final image 90 by selecting the texture information from a corresponding pixel of the CG object texture information 745 or the target view texture information 434 based on the CG object depth information 746 and the target view depth information 436.

In other words, the apparatus 10 may further comprise a final image renderer 780, wherein the final image renderer 780 may be configured to merge the target view image 32 with the at least one computer generated object image 745, wherein the final image renderer 780 may be configured to obtain a final image 90 from the target view texture information 434 and the computer generated object texture information 745 by considering the target view depth information 436 and the computer generated object depth information 746.

In other words, the embodiment of the disclosed apparatus 10, as described in FIG. 7 may comprise the following features:

- Compositing of a light-field rendering, e.g. a final image 90, with CG elements 26 based on the depth map 436 for the target view 32 (see also Section 1).
- Compositing of a light-field rendering, e.g. a final image 90, with CG elements 26 based on a target view depth information 436 that is modified as a function of the proxy mesh 40. This modification may rely on the depth-based texture mapping 401 (c.f. FIG. 5, Section 6).
- Transfer of the illumination falling onto the proxy geometry 40 to the light-field 32 to modify it, e.g. the target view texture information 436 based on additional illumination sources 24.

Real-time rendering engines, such as Unreal-Engine or Unity, form the base of many computer games. They provide a game developer with many features such as 3D modeling & rendering, gameplay design elements and many more. They rely on rendering with explicit geometry (i.e. meshes and UV-maps). Based on the position of lights and objects inside a 3D world (aka a map or level), the engines compute shadows and correct lighting effects. Objects appear brighter or darker, depending on the distance between a considered point and a light. Developers can add missing features by custom designed plug-ins. Those gaming engines heavily exploit the capabilities of modern GPUs in order to render images at real-time frame rates. Light-fields and light-field rendering are usually not part of those engines. The herein disclosed method and apparatus however enable a usage of these well-developed engines when integrating light-fields into CG scenes.

9. Exemplary Application of the Disclosed Method According to FIGS. 8, 9, 10

Figure 8:
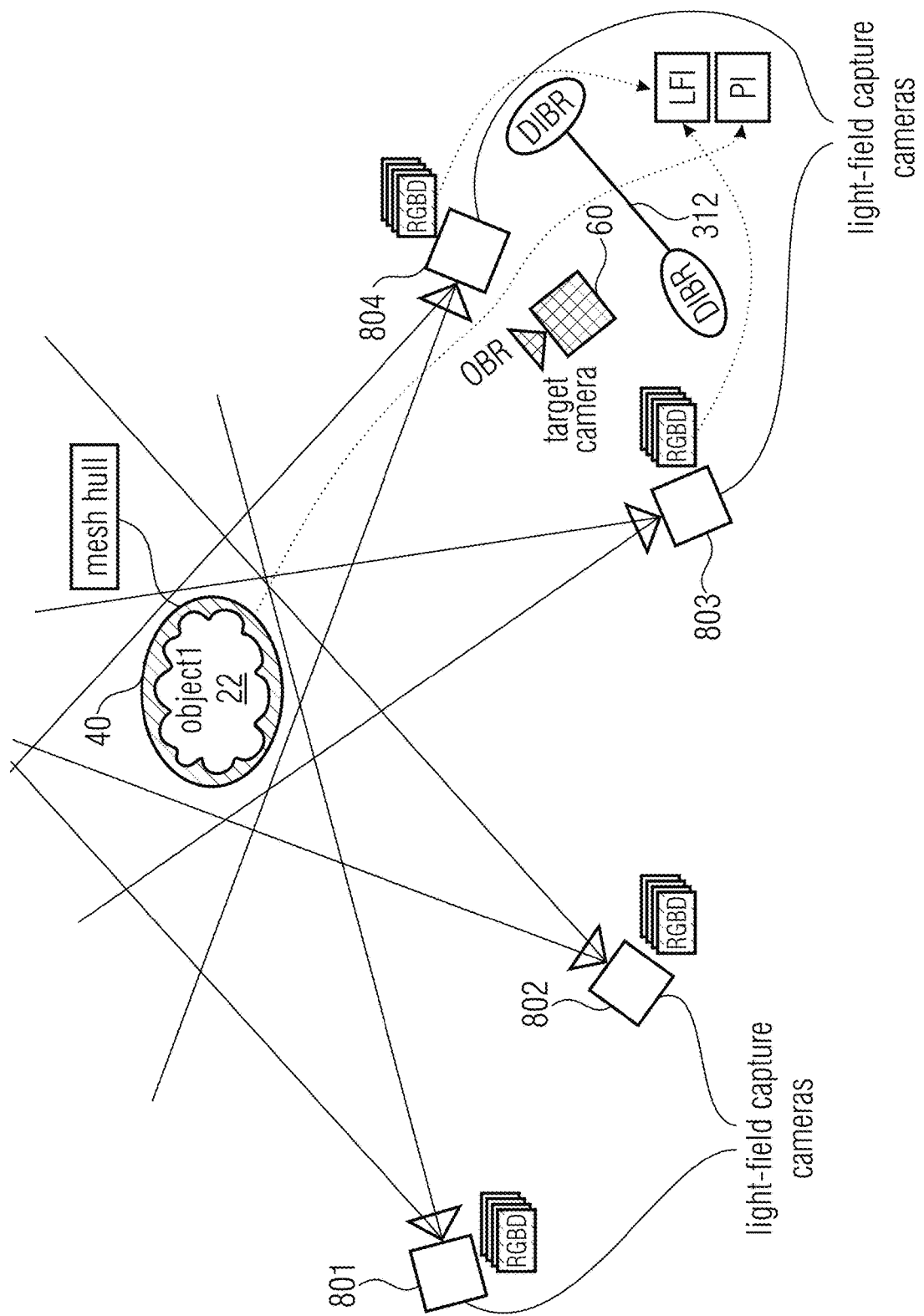
FIG. 8 shows a scheme of an application of a method for rendering a visual scene according to an embodiment.

FIG. 8 shows a schematic representation of an application of the method 300 according to an embodiment. FIG. 8 exemplarily depicts a common situation. It shows a capturing of the object 22 with multiple cameras and projecting it on a proxy mesh 40, which may also be referred to as a coarse mesh or as a mesh hull. A mesh hull may be the simplest form or shape of a proxy mesh.

Several cameras, e.g. light-field capture cameras 801, 802, 803, 804, may observe the object 22 placed in the center of the scene. The proxy mesh 40 as well as a LFR 30 may already be available. Here, a set of disparity maps plus color images (RGBD-data) may represent the LFR 30 and DIBR 312 generates the rendered RGB image 32 e.g. based on the two closest light-field capture cameras for the target camera 60.

Figure 9:
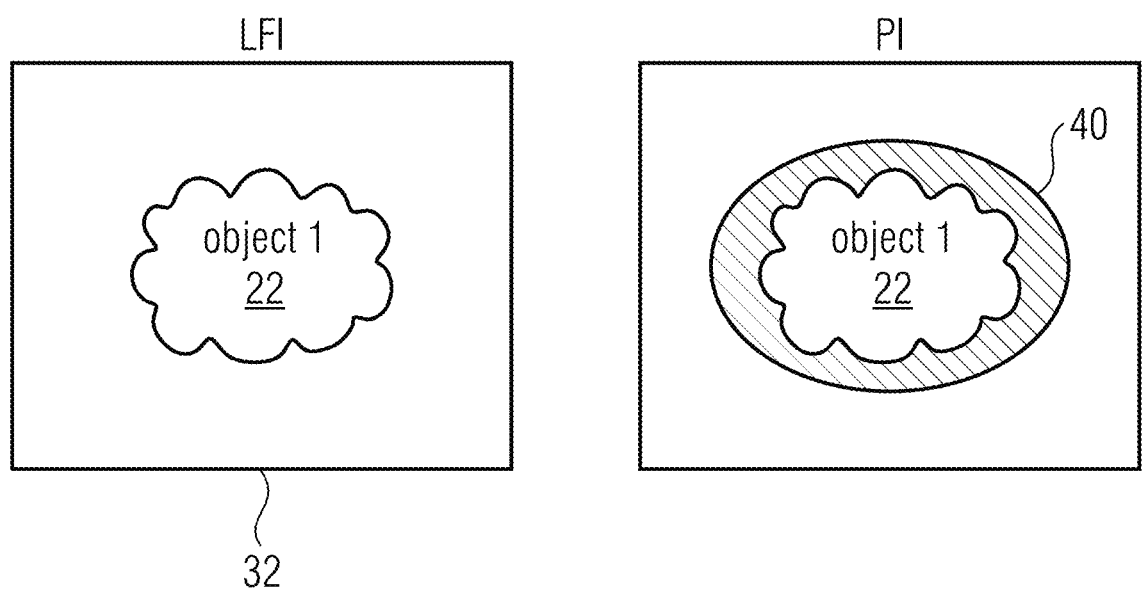
FIG. 9 shows two examples of rendered images.

FIG. 9 illustrates the rendered RGB image 32 (LFI) as well as an image (PI) rendered from the proxy mesh 40. The rendered RGB image 32 directly shows the considered object 22, whereas the rendered proxy mesh comprising the object 22 projected onto it, is exemplarily depicted as a mesh hull 40 surrounding the object 22 and might have a different resolution. In other words, the object 22 is represented by a proxy mesh 40 which, when rendered to the image (PI), may have a lower resolution than the LFI 32 of the object.

In this example, the LFR 32 is aligned with the proxy geometry 40. FIG. 9 illustrates this as both images show the considered object 22 at the same position and at the same scale. Replacing the lower resolution image (PI) with the high-resolution and high quality LFI 32 involves only a very simple mapping.

Figure 10:
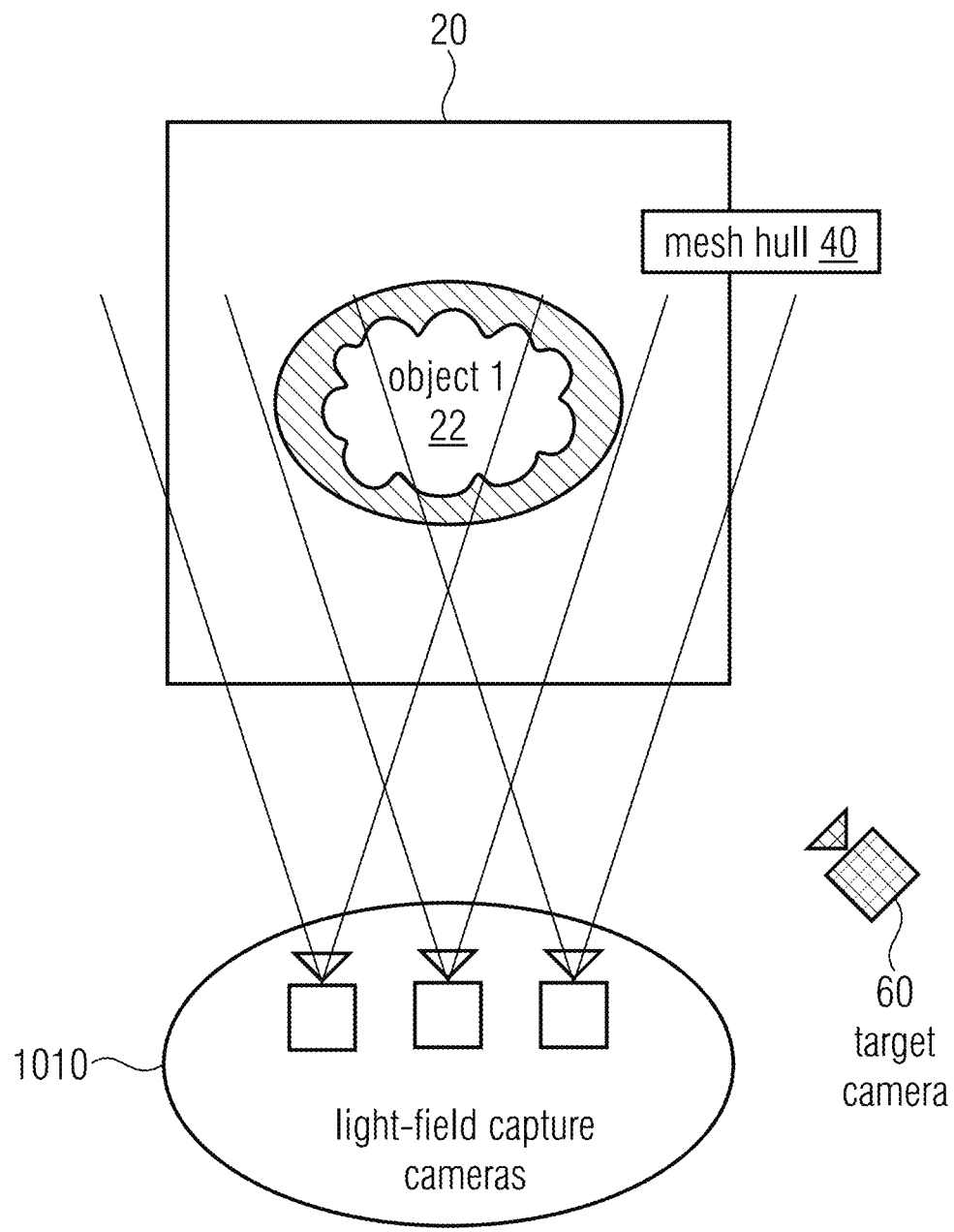
FIG. 10 shows a scheme of an application of a method for rendering a visual scene according to an embodiment.

FIG. 10 shows a scheme of an application of a method 300 for rendering a visual scene according to an embodiment. This exemplary application comprises an object 22 and a set of cameras forming a light-field camera array 1010 to capture the scene 20 comprising the object 22. Although the array 1010 is represented as a planar camera array, this is not necessary. Instead, also non-planar arrays can be used. The mesh hull 40 may be a transparent object that surrounds the captured light-field object. Finally, the previous figure shows a target camera 60 for which the scene 20 should be rendered. This is possible by warping 312 the light-field 30 to the target camera position 60, projecting the image on the transparent mesh hull (e.g. by the image-to-mesh-projection 401), and then rendering the mesh-hull 40 for the target camera again (e.g. by the mesh-to-image-projection 403). Those parts of the mesh hull 40 which have no associated light-field pixel may remain transparent. For the other parts of the mesh hull 40, the transparency may be determined from an alpha channel of the light-field 30. Typically, the alpha channel is one, and the mesh-hull 40 gets opaque. But at the borders of the light-field image 32, also alpha values different than one are possible.

10. Faulty Meshes According to FIG. 11

Figure 11:
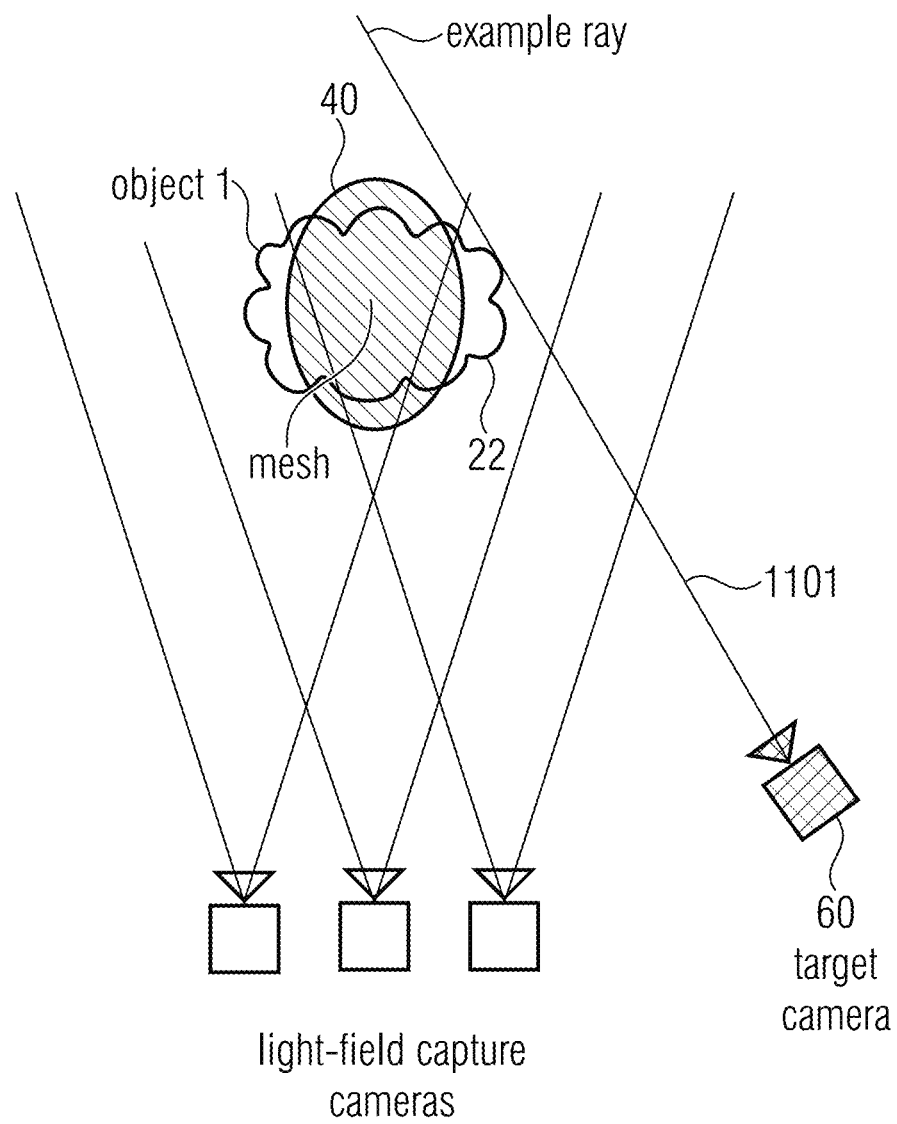
FIG. 11 shows a sketch of an faulty example of a mesh, FIGS. 12, 13 sketch examples of different meshes which may be used in embodiments of the invention, FIG. 14 sketches of a further mesh meshes which may be used in embodiments of the invention.

FIG. 11 sketches a failure case of the construction of a mesh hull 40. The mesh hull 40 does not fully enclose the considered object 22. From the perspective of the target camera 60, some rays as the depicted example ray 1101 possibly do not intersect with the mesh hull 40. According to the principles presented in section 9, the mesh 40 may advantageously be a hull of the object 22 captured as a light-field. In the case shown in FIG. 11, the mesh 40 does not form a hull of the object 20, instead it intersects with the object 20. This means that the shown example ray 1101 of the target camera 60 does not intersect with the mesh 40. Consequently, the pixel represented by the example ray 1101 cannot be projected to the mesh 40, although it belongs to the light-field object 22. This means that the pixel cannot be displayed, which is to avoid.

11. Mesh Geometries According to FIGS. 12, 13

Figure 12:
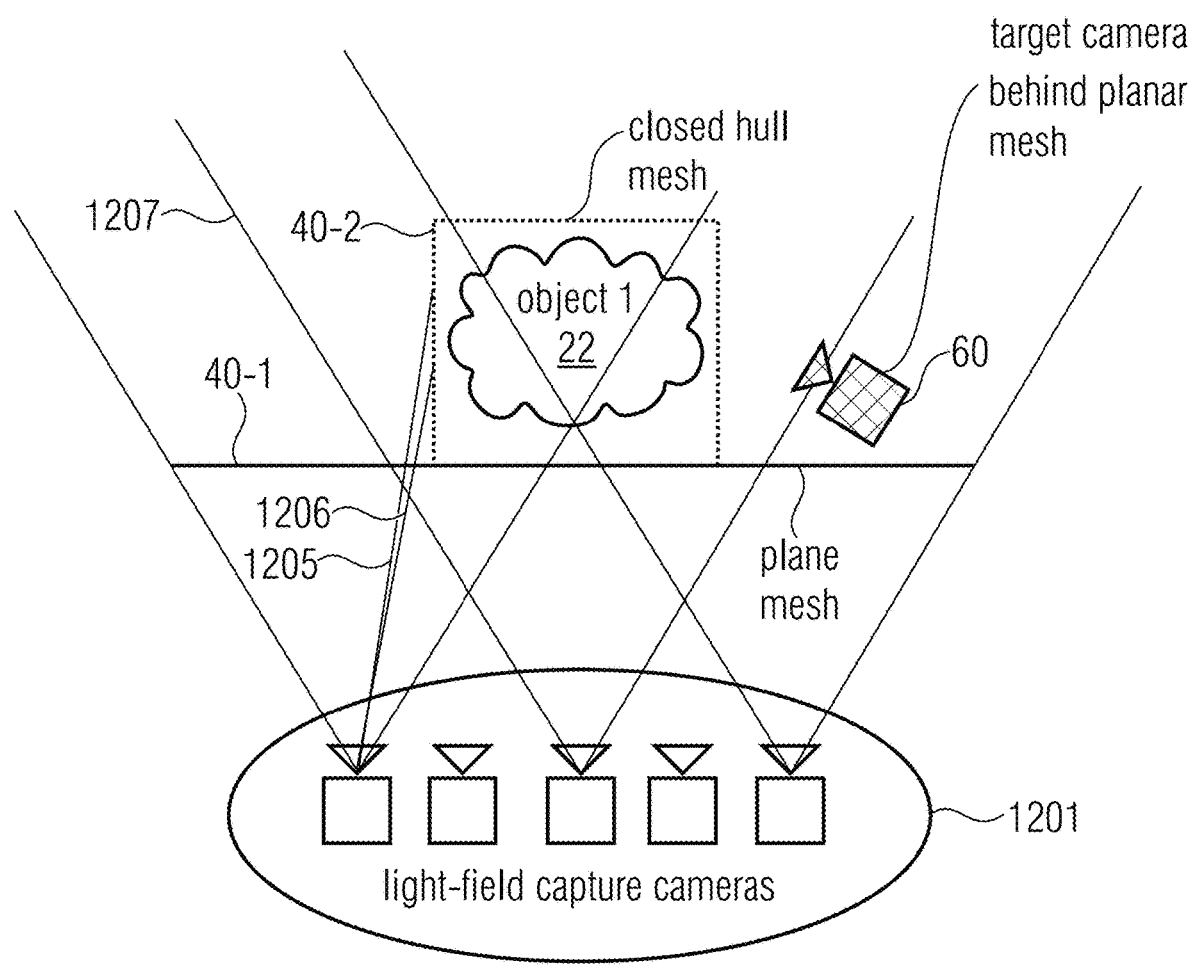

Since the meshes may advantageously surround the objects 22 captured by the light-field 30, a mesh 40 may be advantageously chosen to be a closed volume. This however is not necessary. The reason is that a light-field 30 might only capture parts of an object 22. In FIG. 12, both the closed hull mesh 40-2 and the plane mesh 40-1 are possible options to represent the exemplarily depicted object 22, referred to as 'object 1'. The reason is that the light-field capture cameras 1201 may record the object 22 partially, and all rays from the cameras 1201 to the object 22 may be covered by the plane mesh 40-1.

The closed hull mesh 40-2 may support more different target camera positions 60. In fact a target camera 60 that is behind the plane mesh 40-1 may still produce a reasonable image, however in practice heavy occlusions may occur. Moreover, the effective pixel resolution on the slanted surfaces 1205 may be very low (see rays 1206, 1207). Ideally the target camera position 60 is situated within the window spanned by the light-field capture cameras 1201.

The plane mesh 40-1, may be easier to handle, because the geometric outline is simpler. However, it may approximate the geometry of the real object 22 less precise than the closed hull mesh 40-2. Thus, for interactions of the object 22 with a CG object 26, a closed mesh hull 40-2 may be advantageous.

Figure 13:
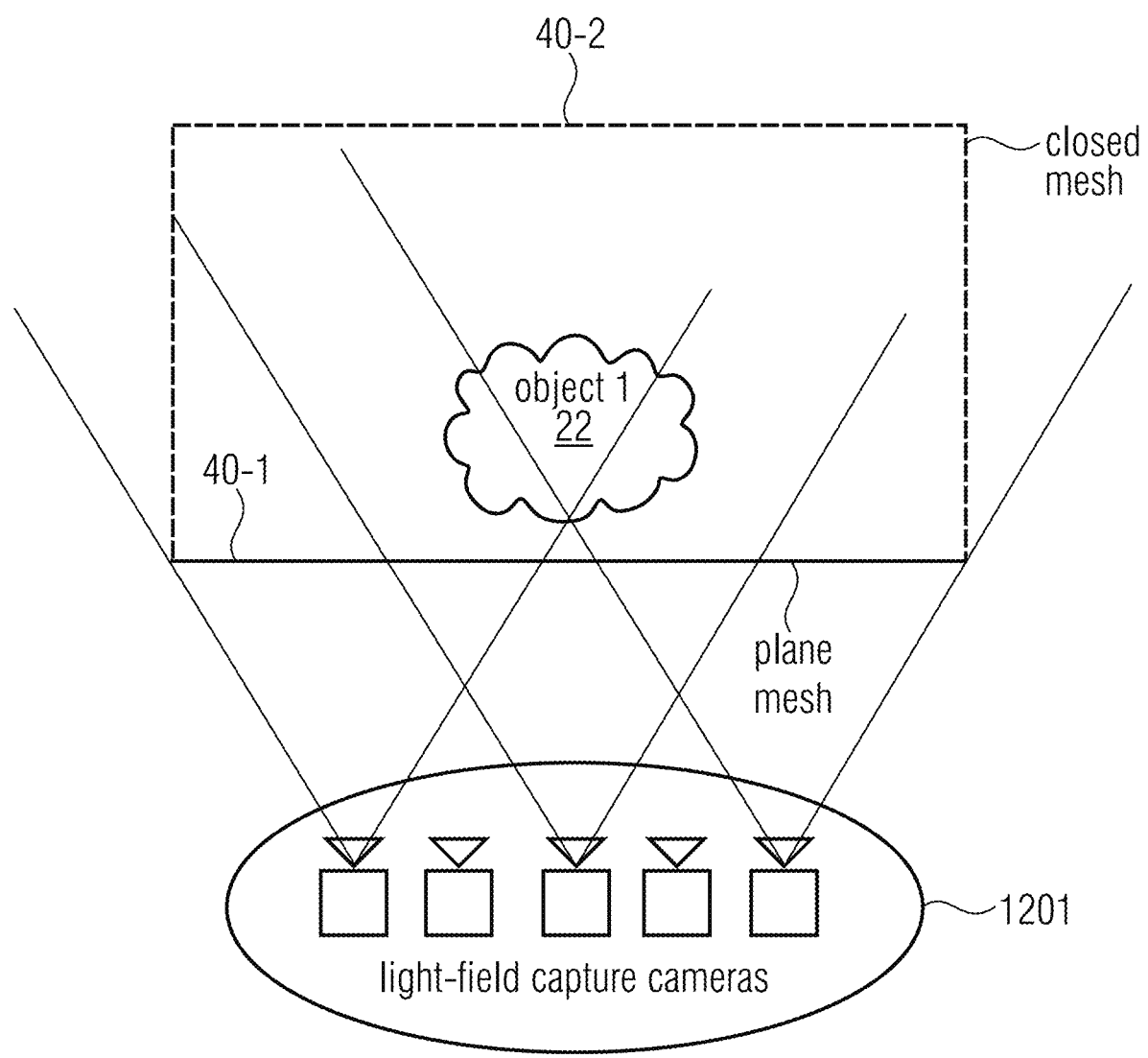

However, both mesh options are viable. From a theoretical point of view, the plane mesh 40-1 may be converted into a closed mesh 40-2 as shown in FIG. 13.

12. Non-Convex Meshes According to FIG. 14

Figure 14:
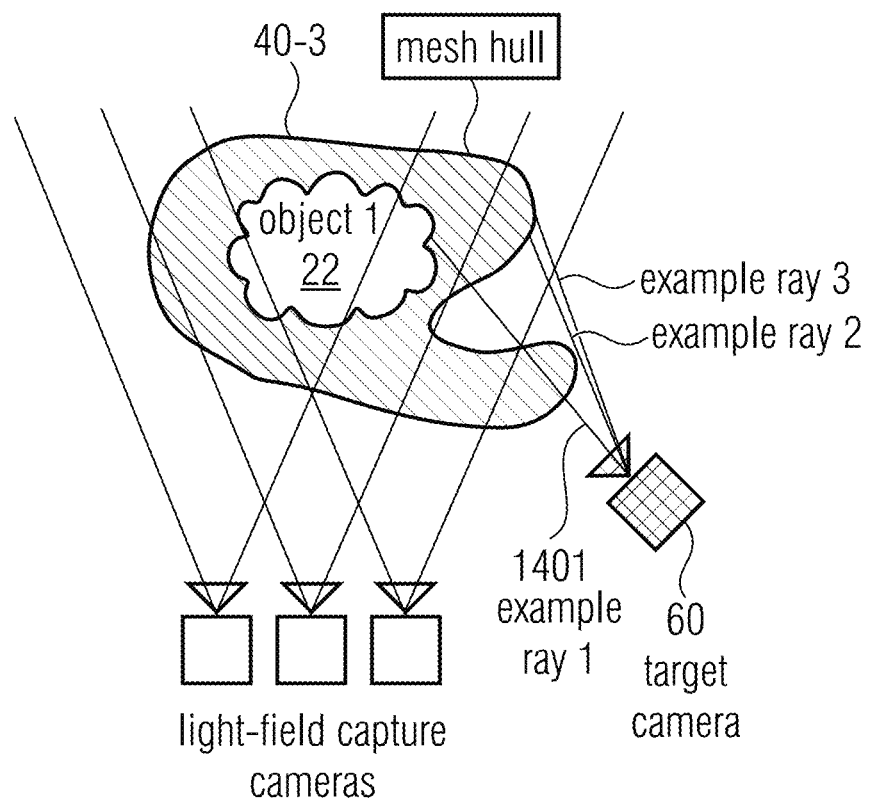

FIG. 14 shows a convex mesh 40-3 of the object 22. Using the mesh 40-3 may cause that a target ray 1401 intersects multiple times with the mesh-hull 40-3. Because the mesh hull 40-3 may be transparent, when nothing is projected onto it, there may be multiple possibilities to project a light-field pixel (shown by the example ray 1 in the previous figure) onto the mesh 40-3. In the shown example, there are three intersections with the mesh 40-3, and hence three possible locations where the light-field pixel could be projected to.

In theory, each of these possibilities may be equally good. Hence, it would be possible to simply pick the first intersection point and project the light-field pixel to it. In practice, however, it might be beneficial to use alternative strategies. This could for instance be the case in VR applications where textures might not be immediately updated. This may be critical for example ray 2 and ray 3, because they may be projected to different locations, although they might be direct neighbors of the captured light-field object. When the observer then moves his head in VR, but the texture is not updated, this may lead to an artifact. In practice such an artefact may be rarely visible, and it may be much more important to pick the correct intersection for proper composition as described in section 6.

Consequently, for VR it might be beneficial to project a light-field pixel to the mesh surface that is closest to the light-field object, and that is located in front of the light-field object 22 relative to the target camera position 60.

13. Rendering Strategies for Light-Fields Modelled as Meshes According to FIG. 15

Figure 15:
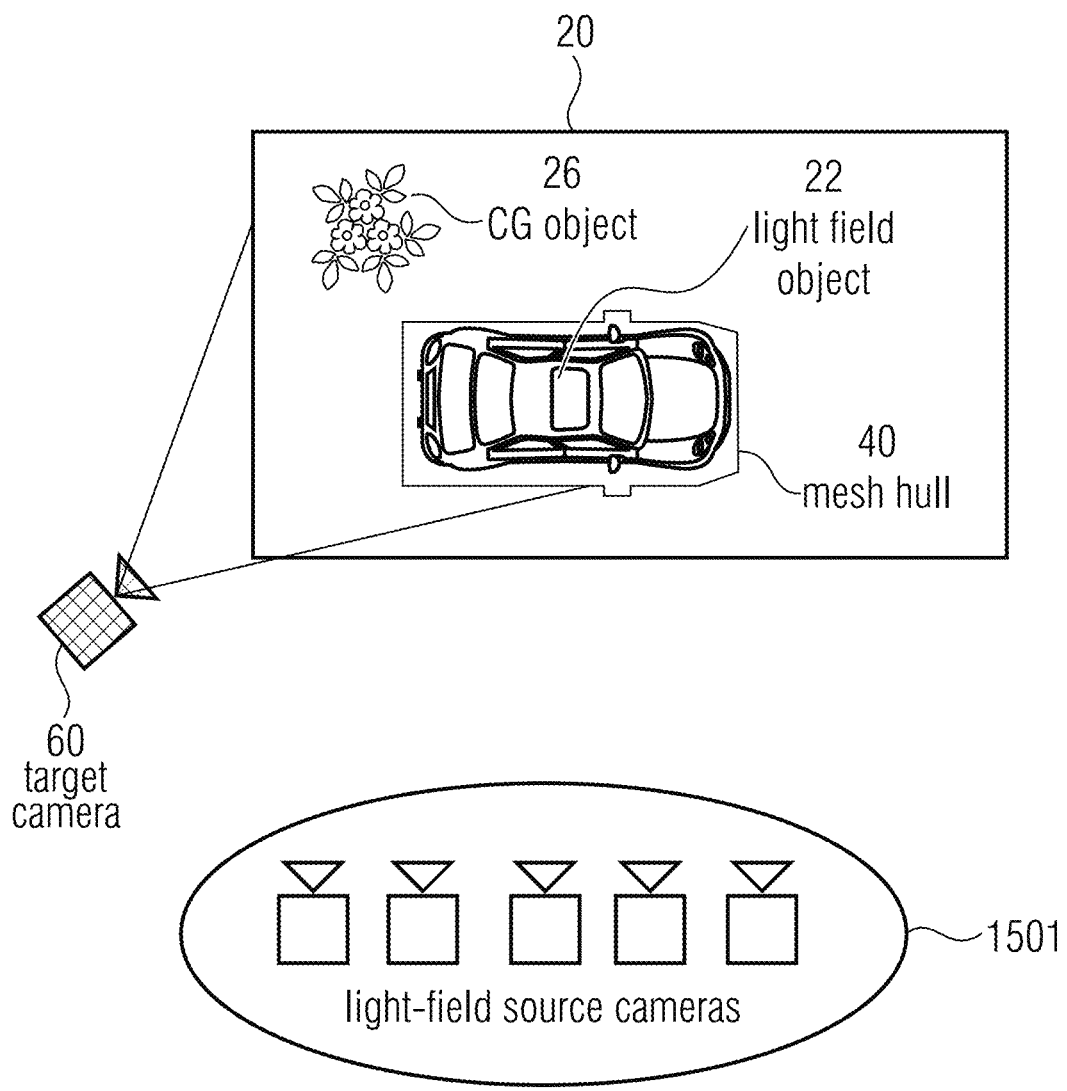
FIG. 15 shows a sketch of an application of a method for rendering a visual scene according to an embodiment, FIG. 16 sketches a multi-camera acquisition of an object according to a common setting.

FIG. 15 sketches an exemplary application of the method 300 according to an embodiment. It shows a light-field object 22 or a light-field scene 22. The capturing of a light field of the object 22, e.g. the set of images 30, may have been performed by means of a light-field camera array 1501. This camera array 1501 may be planar or non-planar. The captured light-field object 22 shall then be integrated into a 3D CG scene 20. The scene 20 that may comprise a CG object 26 (flower) and the light-field object 22 should now be observed from a target camera position 60. This may be possible by performing the following steps, according to a projection based rendering:

1. Perform depth image based rendering to synthesize 312 the view 32 of the target camera 60 from the light-field source cameras 1501 or the set of images 30 captured by the light-field source cameras 1501.
2. Project 318 the synthesized view 32 onto the mesh hull 40. The mesh-hull may be transparent except for those points which have an associated pixel generated from the input light-field 32 for the target camera 60. For this step, any other 3D object may be ignored such that the mesh hull is not occluded by any other object.
3. Render 319 the mesh hull 40 including the projected image and the other CG objects 26 for the target camera 60 using the algorithms of the employed 3D software.

Such an approach has the big benefit, that the light-field 32 is really part of the 3D scene. In other words, shadows, indirect illuminations and other interactions can be correctly taken into account.

This projection based rendering involves two projections (e.g. by the projections 401 and 403): one, where the light-field 32 rendered to the target camera 60 is projected onto the mesh hull 40, and one where the mesh hull 40 is projected back into target camera 60. This solution is very flexible, because the light-field is really part of the 3D environment.

To avoid rendering two times to the same camera positions, an alternative, mask based rendering may be applied. Mask based rendering may comprise a fusing of the light-field rendering 32 with the rendered CG image 745 in image space, and not in the 3D space. This may be done by computing masks for every output pixel, e.g. of the final image 90, indicating whether an output pixel, e.g. of the final image 90, represents a light-field pixel or a pixel created from a mesh projection. To achieve this, a mesh hull 40 may be assigned with a specific identifier value being greater than zero. All normal meshes 328 (not being used as projection element for a light-field) representing traditional CG objects 26 may be labeled by the identifier value zero. For creation of the output image 90, the following steps may be performed:

1. Render the RGB target view 745 for all CG objects excluding the transparent mesh hulls. This step may contains a z-test: The z-test may select the closest mesh polygon to the camera 60, if several mesh polygons are projected to the same pixel.
2. Render an identifier target view for all CG objects 26 including the mesh hulls 746. In this step, the mesh hulls may be considered to be non-transparent. This step may perform a z-test as well.
3. Perform 312 image based rendering to generate the target camera view 32 from the light-field source cameras 1501.
4. Create the final image 90 by replacing all RGB pixels from step 1 with the corresponding pixel from step 3, if the latter is not transparent (there exists a rendered pixel value) and when the identifier value of step 2 corresponds to the mesh identifier associated with the light-field.

Such an approach may not allow to properly generate shadows on the light-field image, nor to apply indirect illumination from the light-field to other CG objects.

An even simpler rendering strategy may comprise the following steps:

1. Ignore the mesh hulls
2. Render the CG objects and keep the depth values from the z-test
3. Perform a depth image based rendering to generate the target camera view 32 from the light-field source cameras and keep the depth (disparity) as well, wherein the depth may be computed relative to the target camera.
4. Merge the two images from step 2 and step 3 by keeping only the pixel that has smaller depth (larger disparity), when both of them are not transparent.

This method may comprise the same restrictions as mask based rendering.

A further embodiment of the method 300 uses a rendering using pseudo depths. By using pseudo-depth values for a merging of a rendered CG image and a rendered light-field image, a rendering using deep images may be implemented, even if precise depth maps for the rendered light-field image are not available. The rendering using pseudo depths may comprise the steps:
1. Render a CG object 26 and keep depth values from a z-test. The depth values may be relative to the target camera 60.
2. Perform image based rendering to generate the target camera view 32 from the light-field source cameras 30 and keep the depth 436, if available.
3. Create a pseudo depth map for the rendered light-field 32. This pseudo depth map could for instance be created by projecting the mesh hulls 40 to the target camera 60 and use the resulting depth values as depth values for the rendered light-field image. Alternatively, the depth values obtained from light-field rendering may be clamped to a certain range.
4. Merge the two images from step 1 and step 2 by keeping for two non-transparent pixels the pixel with a smaller depth (larger disparity), using the depth of the CG image and the pseudo-depth map.

This embodiment may mimic the method of [25] without projecting the texture to a planar surface.

14. Conventional Rendering Solutions According to FIGS. 16, 17, 18

FIG. 16 shows a sketch of a multi-camera acquisition with three cameras of an object according to a common setting. A camera may acquire an image, e.g. a light-field image, for the set of images 30.

Figure 17:
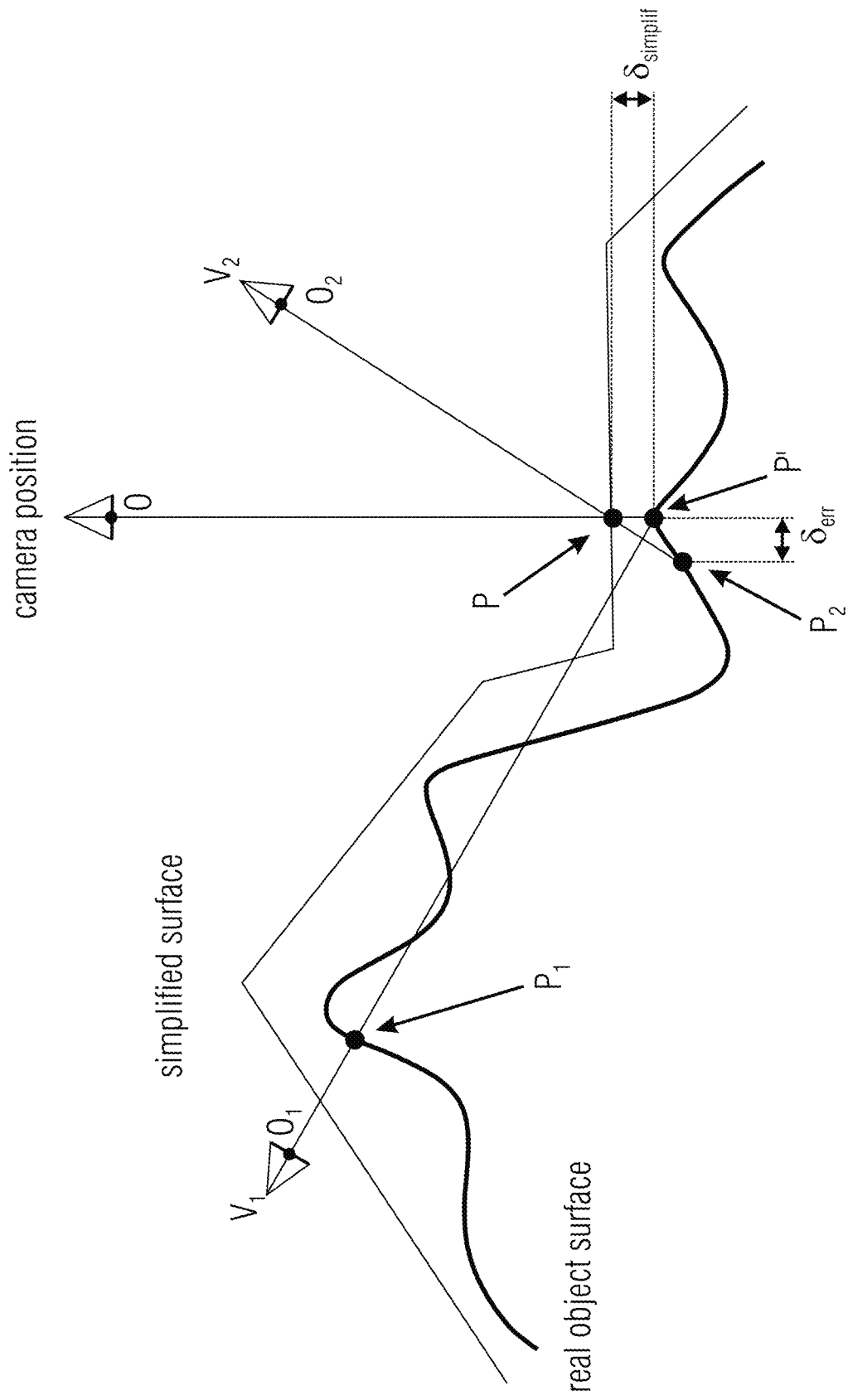
FIG. 17 shows a scheme for projecting texture onto a mesh according to a common solution.

FIG. 17 shows a scheme for projecting texture onto a mesh according to a conventional solution.

Figure 18B:
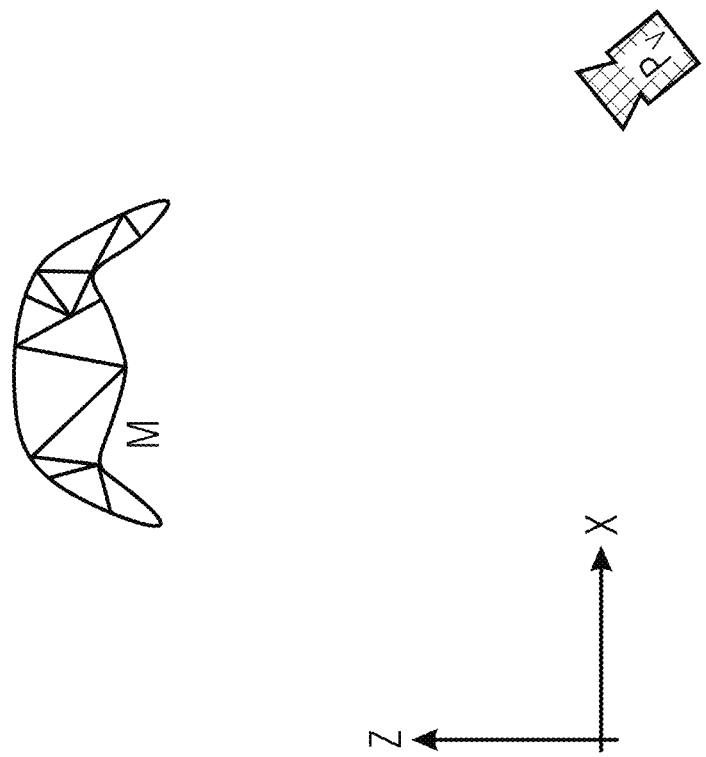
FIG. 18B shows a scheme for rendering an object according to a common solution.
Figure 18A:
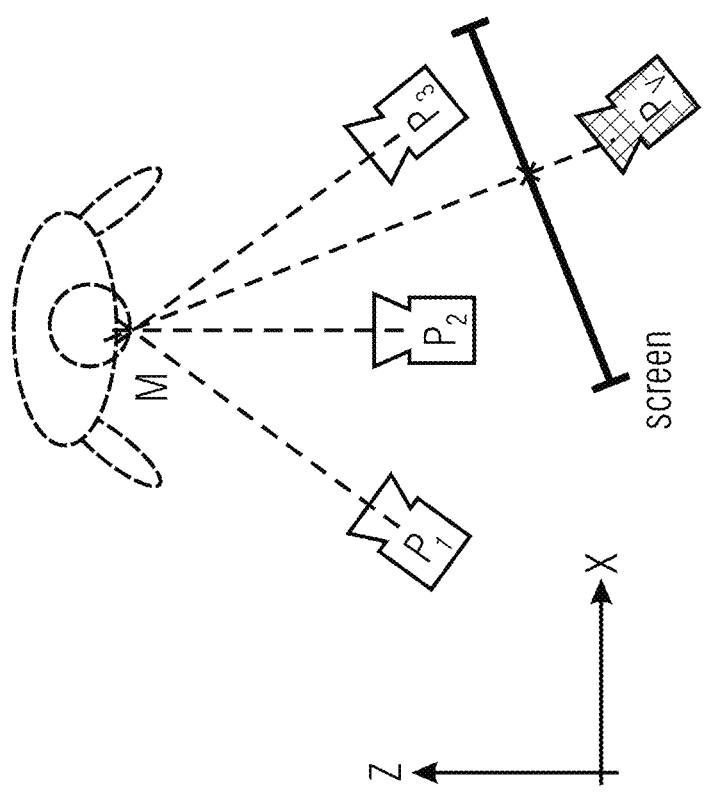
FIG. 18A shows a scheme for rendering an object according to a common solution.

FIGS. 18A and 18B show two schemes for rendering an object according to conventional solutions. The solution shown in FIG. 18A projects a multi-camera representation of an object onto a planar screen from the perspective of a target camera $P_v$. The solution shown in FIG. 18B projects a mesh representing an object onto a target camera $P_v$.

Figure 19:
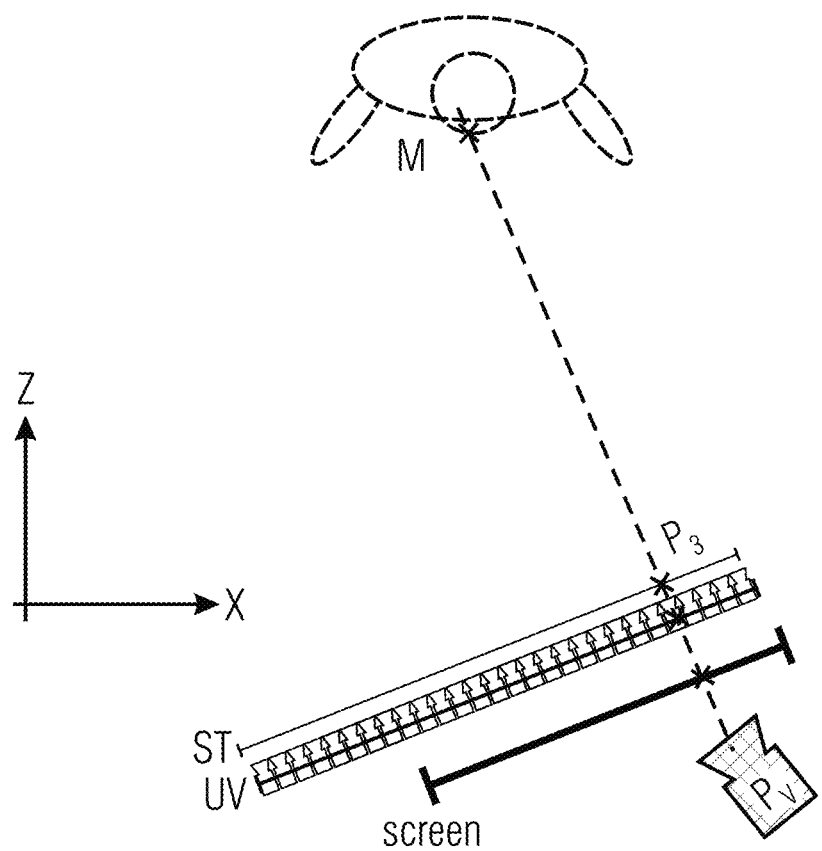
FIG. 19 shows a scheme for rendering an object according to a common solution.

FIG. 19 shows a scheme for rendering an object according to a conventional solution, projecting an object onto a planar screen, making use of a ST-UV representation of the object.

15. Further Considerations Regarding the Invention

The disclosed apparatus 10 and method 300 further provide the following functionalities and advantages:

The combination and integration of real-world objects into CG environments remains a challenging task, especially if dynamic objects such as moving and interacting actors are considered. As pointed out, the realism of the result depends on the texture resolution and on the realism of lights and shadows. Meshes are well-suited for the simulation of light and shadows but they are less suited for the representation of high resolution textures and view depended appearance. One of the problems faced in this disclosure aims to combine highest texture quality and realistic lights and shadows.

The disclosure provides a method and an apparatus to integrated light field content into a CG scene, allowing for proper occlusions between objects, as well as better relighting. To this end, the light-field is rendered to the desired target position before being projected onto a coarse proxy geometry. By these means, the benefits of image based rendering are combined with capabilities of traditional meshes such as occlusion tests. The proposed below can generate shadows very accurately, in case transparency is evaluated.

This disclosure combines classical 3D rendering with light-field rendering. Given the approximated geometry of a real-world object plus a light-field or a multi-camera representation of the corresponding color and material appearance, the method described herein may directly compute the lighting and shadow effects based on the proxy geometry and the color information based on the multi-camera representation. In the following, light-field and multi-camera representation are used synonymously.

The proposed technology aims to replace a smaller or larger portion of a CG scene with high quality footage, e.g. a real-world footage. E.g. two human actors may be captured in front of a green-screen and afterwards this footage is combined with a complex CG designed scene.

The invented apparatus and method relies on stitching free view rendering for texturing a mesh. The invented apparatus and method refer to light-fields, meshes, texture projection, a rendering engine, virtual reality, DIBR, image based rendering and relighting.

The invention may further be realized by the following embodiments:
1. Method 300 for rendering a visual scene 20, the method 300 comprising:
   obtaining 301 as a first input a set of images 30 of one or more objects 22, and obtaining as a second input a geometry representation 40 of the one or more objects 22 in a 3D-space, the geometry representation 40 comprising a position information of the one or more objects within the visual scene,
   obtaining 305 a final image 90 representing the visual scene 20 from a perspective of a target position 60, the visual scene 20 comprising the one or more objects 22, and
   considering 16 at least one of a lighting effect 24 and/or an object interaction effect between the one or more objects 22 and one or more further objects 26 contained in the visual scene 20,
   wherein the method 300 further comprises:
   synthesizing 312 a target view image 32 from the set of images 30 irrespective of the geometry representation 40, the target view image 32 representing the one or more objects 22 from the perspective of the target position 60, and
   mapping 318 the target view image 32 on the geometry representation 40 under consideration of the target position 60.
2. Method according to embodiment 1, wherein the geometry representation 40 of the one or more objects comprises a mesh 340, the mesh 340 indicating a position of at least one of the one or more objects 22 within the visual scene 20 and a geometry of the at least one of the one or more objects 22.
3. Method according to embodiment 2, wherein the mesh 340 is a three-dimensional structure.
4. Method according to embodiment 2, wherein the mesh 340 is a closed coarse hull enclosing the at least one of the one or more objects 22.
5. Method according to one of the preceding embodiments, wherein the set of images 30 is based on a light field representation of the one or more objects 22 and wherein at least one of the images comprises an image texture information and an image depth information.
6. Method according to one of the preceding embodiments, wherein the target view image 32 comprises a target view texture information 434 and a target view depth information 436.

7. Method according to one of the preceding embodiments, wherein the step of texture mapping 318 comprises mapping a point 585 of the target view image 32 on a point 583 of the geometry representation 40 by obtaining at least one intersection point of a straight line 580 with the geometry representation 40, the straight line 580 passing through the target position 60 and through the point 585 of the target view image 32.

8. Method according to one of the preceding embodiments, wherein the texture mapping 318 uses the target view depth information 436 for selecting a point of the geometry representation 40 on which a point of the target view image 32 is mapped.

9. Method according to one of the preceding embodiments, wherein the geometry representation 40 comprises one or more mesh texture maps 444, and wherein the texture mapping 318 obtains a mesh texture information for the mesh texture map 444 by mapping the target view texture information 434 on the one or more mesh texture maps 444.

10. Method according to one of the embodiments 1-8, wherein the texture mapping 318 uses the target view texture information 434 as a mesh texture map 444 for the geometry representation 40, and wherein the texture mapping 318 maps a point of the geometry representation 40 to a point of the mesh texture map 444.

11. Method according to one of embodiments 9 or 10, wherein the content visualization 316 obtains an illumination information for a point on the geometry representation 40, and
wherein the content visualization 316 uses the illumination information to adapt the mesh texture map 444 of the geometry representation 40.

12. Method according to one of the preceding embodiments, wherein the content visualization 316 obtains at least one computer generated object representation 327 comprising a computer generated object mesh 328 and a computer generated object texture map 329.

13. Method according to embodiment 12, wherein the method 300 further comprises a step of final rendering 305,
wherein the step of final rendering 305 projects the geometry representation 40 of the one or more objects 22 and/or the computer generated object mesh 328 of the at least one computer generated object representation 327 into a final image 90 under consideration of the target position 60, and
wherein the step of final rendering 305 obtains a texture of the final image 90 by using a mesh texture information 444 of the geometry representation 40 and the computer generated object texture map 329 of the at least one computer generated object representation 327.

14. Method according to one of the embodiments 1-8, wherein the texture mapping 318 uses the geometry representation 40 to obtain a depth information 436 for the target view image 32, wherein the target view image 32 comprises a target view texture information 436.

15. Method according to embodiment 14,
wherein the content visualization 316 obtains an illumination information for a point on the geometry representation 40, and
wherein the texture mapping 318 uses the illumination information to adapt the target view texture information 434.

16. Method according one of the embodiments 14 or 15,
wherein the content visualization 316 obtains at least one computer generated object image 744 under consideration of the target position 60,
wherein the at least one computer generated object image 744 comprises a computer generated object texture information 745 and a computer generated object depth information 746.

17. Method according to embodiment 16, the method further comprising a step of final rendering 780, wherein the step of final rendering 780 merges the target view image 32 with the at least one computer generated object image 745,
wherein the step of final rendering 780 obtains a final image 90 from the target view texture information 434 and the computer generated object texture information 745 by considering the target view depth information 436 and the computer generated object depth information 746.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

ABBREVIATIONS

CG Computer generated
LFR Light-field representation
NVS Novel view synthesis method
MCA Multi-camera array
IBR Image based rendering
DIBR Depth image based rendering

REFERENCES

[1] S. J. Gortler, R. Grzeszczuk, R. Szeliski, and M. F. Cohen, "The lumigraph." pp. 43-54.
[2] M. Levoy, and P. Hanrahan, "Light field rendering." pp. 31-42.
[3] E. H. Adelson, and J. R. Bergen, The plenoptic function and the elements of early vision: Vision and Modeling Group, Media Laboratory, Massachusetts Institute of Technology, 1991.
[4] C. Buehler, M. Bosse, L. McMillan, S. Gortler, and M. Cohen, "Unstructured Lumigraph Rendering." pp. 425-432.
[5] H. Y. Shum, S. C. Chan, and S. B. Kang, Image-Based Rendering: Springer US, 2008.
[6] J. Flynn, M. Broxton, P. Debevec, M. DuVall, G. Fyffe, R. Overbeck, N. Snavely, and R. Tucker, "DeepView: View Synthesis with Learned Gradient Descent," arXiv preprint arXiv:1906.07316, 2019.
[7] T. Akenine-Moller, E. Haines, and N. Hoffman, Real-time rendering: AK Peters/CRC Press, 2008.
[8] M. Kazhdan, M. Bolitho, and H. Hoppe, "Poisson surface reconstruction."
[9] M. Eisemann, B. De Decker, M. Magnor, P. Bekaert, E. De Aguiar, N. Ahmed, C. Theobalt, and A. Sellent, "Floating textures." pp. 409-418.
[10] H. P. Lensch, W. Heidrich, and H.-P. Seidel, "Automated texture registration and stitching for real world models." pp. 317-452.
[11] A. Dessein, W. A. Smith, R. C. Wilson, and E. R. Hancock, "Seamless texture stitching on a 3D mesh by Poisson blending in patches." pp. 2031-2035.
[12] A. Collet, M. Chuang, P. Sweeney, D. Gillett, D. Evseev, D. Calabrese, H. Hoppe, A. Kirk, and S. Sullivan, "High-quality streamable free-viewpoint video," ACM Transactions on Graphics (TOG), vol. 34, no. 4, pp. 69, 2015.
[13] P. Debevec, Y. Yu, and G. Borshukov, "Efficient view-dependent image-based rendering with projective texture-mapping," Rendering Techniques' 98, pp. 105-116: Springer, 1998.
[14] D. Porquet, J.-M. Dischler, and D. Ghazanfarpour, "Real-time high-quality view-dependent texture mapping using per-pixel visibility." pp. 213-220.
[15] R. S. Overbeck, D. Erickson, D. Evangelakos, M. Pharr, and P. Debevec, "A system for acquiring, processing, and rendering panoramic light field stills for virtual reality." p. 197.
[16] P. Hedman, T. Ritschel, G. Drettakis, and G. Brostow, "Scalable inside-out image-based rendering," ACM Transactions on Graphics (TOG), vol. 35, no. 6, pp. 231, 2016.
[17] W.-C. Chen, J.-Y. Bouguet, M. H. Chu, and R. Grzeszczuk, "Light field mapping: Efficient representation and hardware rendering of surface light fields." pp. 447-456.
[18] D. N. Wood, D. I. Azuma, K. Aldinger, B. Curless, T. Duchamp, D. H. Salesin, and W. Stuetzle, "Surface light fields for 3D photography." pp. 287-296.
[19] J. Thies, M. Zollhöfer, and M. Nießner, "Deferred Neural Rendering: Image Synthesis using Neural Textures," arXiv preprint arXiv:1904.12356, 2019.
[20] J. F. Blinn, "Simulation of wrinkled surfaces." pp. 286-292.
[21] J. Cohen, M. Olano, and D. Manocha, "Appearance-preserving simplification." pp. 115-122.
[22] P. Cignoni, C. Montani, C. Rocchini, and R. Scopigno, "A general method for preserving attribute values on simplified meshes." pp. 59-66.
[23] T. Kaneko, T. Takahei, M. Inami, N. Kawakami, Y. Yanagida, T. Maeda, and S. Tachi, "Detailed shape representation with parallax mapping." pp. 205-208.
[24] W. F. Engel, ShaderX3: Advanced Rendering with DirectX and OpenGL: Charles River Media, 2005.
[25] M. Ziegler, J. Keinert, N. Holzer, T. Wolf, T. Jaschke, R. op het Veld, F. S. Zakeri, and S. Foessel, "Immersive virtual reality for live-action video using camera arrays," in IBC Conference, Amsterdam, Netherlands, 2017, pp. 1-8.

[26] https://developers.google.com/vr/discover/seurat
[27] https://answers.unrealengine.com/questions/31993/make-an-object-invisible-but-with-shadows.html
[28] https://learnopengl.com/In-Practice/2D-Game/Collisions/Collision-detection

The invention claimed is:

1. Method for rendering a visual scene, the method comprising:
   acquiring as a first input a set of images of one or more objects, and acquiring as a second input a geometry representation of the one or more objects in a 3D-space, the geometry representation comprising a position information of the one or more objects within the visual scene, wherein the set of images is based on a light field representation of the one or more objects and wherein at least one of the set of images comprises an image texture information and an image depth information,
   acquiring a final image representing the visual scene from a perspective of a target position, the visual scene comprising the one or more objects, and
   considering at least one of a lighting effect and/or an object interaction effect between the one or more objects and one or more further objects comprised by the visual scene,
   wherein the method further comprises:
      synthesizing a target view image from the set of images irrespective of the geometry representation, the target view image representing the one or more objects from the perspective of the target position, and
      mapping the target view image on the geometry representation under consideration of the target position.

2. A non-transitory digital storage medium having a computer program stored thereon for causing a computer to execute a method for rendering a visual scene, said method comprising:
   acquiring as a first input a set of images of one or more objects, and acquiring as a second input a geometry representation of the one or more objects in a 3D-space, the geometry representation comprising a position information of the one or more objects within the visual scene, wherein the set of images is based on a light field representation of the one or more objects and wherein at least one of the set of images comprises an image texture information and an image depth information,
   acquiring a final image representing the visual scene from a perspective of a target position, the visual scene comprising the one or more objects, and
   considering at least one of a lighting effect and/or an object interaction effect between the one or more objects and one or more further objects comprised by the visual scene,
   wherein the method further comprises:
      synthesizing a target view image from the set of images irrespective of the geometry representation, the target view image representing the one or more objects from the perspective of the target position, and
      mapping the target view image on the geometry representation under consideration of the target position.

3. Apparatus for rendering a visual scene, the apparatus comprising:
   a content visualization stage configured to
   acquire as a first input a set of images of one or more objects, and to acquire as a second input a geometry representation of the one or more objects in a 3D-space, the geometry representation comprising a position information of the one or more objects within the visual scene,
   acquire a final image representing the visual scene from a perspective of a target position, the visual scene comprising the one or more objects, and
   consider at least one of a lighting effect and/or an object interaction effect between the one or more objects and one or more further objects comprised by the visual scene,
   wherein the content visualization stage comprises:
      a target view synthesis stage configured to acquire a target view image from the set of images irrespective of the geometry representation, the target view image representing the one or more objects from the perspective of the target position, and
      a texture mapping block being configured to map the target view image on the geometry representation under consideration of the target position,
   wherein the apparatus is implemented by a hardware apparatus,
   wherein the target view image comprises a target view texture information and a target view depth information, and
   wherein the texture mapping block is configured to use the target view depth information for selecting a point of the geometry representation on which a point of the target view image is mapped.

4. Apparatus for rendering a visual scene, the apparatus comprising a processor that is configured to perform a content visualization stage, wherein in the content visualization stage, the processor is configured to
   acquire as a first input a set of images of one or more objects, and to acquire as a second input a geometry representation of the one or more objects in a 3D-space, the geometry representation comprising a position information of the one or more objects within the visual scene, wherein the set of images is based on a light field representation of the one or more objects and wherein at least one of the set of images comprises an image texture information and an image depth information,
   acquire a final image representing the visual scene from a perspective of a target position, the visual scene comprising the one or more objects, and
   consider at least one of a lighting effect and/or an object interaction effect between the one or more objects and one or more further objects comprised by the visual scene,
   wherein the content visualization stage comprises:
      a target view synthesis stage configured to acquire a target view image from the set of images irrespective of the geometry representation, the target view image representing the one or more objects from the perspective of the target position, and
      a texture mapping block being configured to map the target view image on the geometry representation under consideration of the target position.

5. Apparatus according to claim 4,
   wherein the geometry representation of the one or more objects comprises a mesh, the mesh indicating a position of at least one of the one or more objects within the visual scene and a geometry of the at least one of the one or more objects.

6. Apparatus according to claim 5,
wherein the mesh is a three-dimensional structure.

7. Apparatus according to claim 5,
wherein the mesh is a closed coarse hull enclosing the at least one of the one or more objects.

8. Apparatus according to claim 4,
wherein the target view image comprises a target view texture information and a target view depth information.

9. Apparatus according to claim 4,
wherein the texture mapping block is configured to map a point of the target view image on a point of the geometry representation by acquiring at least one intersection point of a straight line with the geometry representation, the straight line passing through the target position and through the point of the target view image.

10. Apparatus according to claim 4,
wherein the geometry representation comprises one or more mesh texture maps, and
wherein the texture mapping block is configured to acquire a mesh texture information for the one or more mesh texture maps by mapping the target view texture information on the one or more mesh texture maps.

11. Apparatus according to claim 10,
wherein the content visualization stage is configured to acquire an illumination information for a point on the geometry representation, and
wherein the content visualization stage is configured to use the illumination information to adapt the mesh texture map of the geometry representation.

12. Apparatus according to claim 4,
wherein the target view image comprises a target view texture information, wherein the texture mapping block is configured to use the target view texture information as a mesh texture map for the geometry representation, and wherein the texture mapping block is configured to map a point of the geometry representation to a point of the mesh texture map.

13. Apparatus according to claim 4,
wherein the content visualization stage is configured to acquire at least one computer generated object representation representing one of the one or more further objects, and comprising a computer generated object mesh and a computer generated object texture map.

14. Apparatus according to claim 13,
wherein the apparatus further comprises a final image renderer,
wherein the final image renderer is configured to project the geometry representation of the one or more objects and/or the computer generated object mesh of the at least one computer generated object representation into the final image under consideration of the target position, and
wherein the final image renderer is configured to acquire a texture of the final image by using a mesh texture information of the geometry representation and the computer generated object texture map of the at least one computer generated object representation.

15. Apparatus according to claim 4,
wherein the texture mapping block is configured to use the geometry representation to acquire a depth information for the target view image,
wherein the target view image comprises a target view texture information.

16. Apparatus according to claim 15,
wherein the content visualization stage is configured to acquire an illumination information for a point on the geometry representation, and
wherein the texture mapping block is configured to use the illumination information to adapt the target view texture information.

17. Apparatus according to claim 15,
wherein the content visualization stage is configured to acquire at least one computer generated object image under consideration of the target position,
wherein the at least one computer generated object image comprises a computer generated object texture information and a computer generated object depth information.

18. Apparatus according to claim 17,
the apparatus further comprising a final image renderer,
wherein the final image renderer is configured to merge the target view image with the at least one computer generated object image,
wherein the final image renderer is configured to acquire the final image from the target view texture information and the computer generated object texture information by considering the target view depth information and the computer generated object depth information.

19. Apparatus according to claim 4, wherein the target view synthesis stage is configured to perform the synthesis of the target view image from the set of images in a meshless manner.

* * * * *